(12) United States Patent
Jo et al.

(10) Patent No.: US 11,724,245 B2
(45) Date of Patent: Aug. 15, 2023

(54) INTEGRATED HEAT EXCHANGER REACTORS FOR RENEWABLE FUEL DELIVERY SYSTEMS

(71) Applicant: AMOGY Inc., Brooklyn, NY (US)

(72) Inventors: Young Suk Jo, Brooklyn, NY (US); Hyunho Kim, Brooklyn, NY (US)

(73) Assignee: AMOGY Inc., Brooklyn, NY (US)

( * ) Notice: Subject to any disclaimer, the term of this patent is extended or adjusted under 35 U.S.C. 154(b) by 0 days.

(21) Appl. No.: 17/401,993

(22) Filed: Aug. 13, 2021

(65) Prior Publication Data

US 2023/0053230 A1    Feb. 16, 2023

(51) Int. Cl.

| | |
|---|---|
| *B01J 19/24* | (2006.01) |
| *F28F 1/12* | (2006.01) |
| *B01J 37/02* | (2006.01) |
| *B01J 37/08* | (2006.01) |
| *H01M 8/04014* | (2016.01) |
| *H01M 8/0606* | (2016.01) |
| *B08B 3/08* | (2006.01) |

(52) U.S. Cl.
CPC .......... *B01J 19/248* (2013.01); *B01J 19/244* (2013.01); *B01J 37/024* (2013.01); *B01J 37/0217* (2013.01); *B01J 37/08* (2013.01); *B08B 3/08* (2013.01); *F28F 1/12* (2013.01); *H01M 8/04014* (2013.01); *H01M 8/0606* (2013.01); *B01J 2219/00081* (2013.01); *B01J 2219/00085* (2013.01); *B01J 2219/2465* (2013.01); *B01J 2219/2466* (2013.01); *H01M 2250/20* (2013.01)

(58) Field of Classification Search
CPC ...... B01J 19/244; B01J 19/248; B01J 19/249; B01J 19/2425; B01J 2219/2465; B01J 2219/2466; B01J 2219/00096; B01J 2219/00094; B01J 2219/00117
See application file for complete search history.

(56) References Cited

U.S. PATENT DOCUMENTS

| | | | |
|---|---|---|---|
| 2,013,809 A | 9/1935 | Hall | |
| 3,198,604 A * | 8/1965 | Pfefferle | C01B 3/047 |
| | | | 423/658.2 |

(Continued)

FOREIGN PATENT DOCUMENTS

| | | |
|---|---|---|
| AU | 2020267318 A1 | 6/2021 |
| CA | 2676027 A1 | 8/2008 |

(Continued)

OTHER PUBLICATIONS

Machine Translation of JP 2020-040860 A (Year: 2020).*

(Continued)

*Primary Examiner* — Lessanework Seifu
(74) *Attorney, Agent, or Firm* — Wilson Sonsini Goodrich & Rosati

(57) ABSTRACT

An apparatus includes an integrated heat exchanger and reactor module. The integrated heat exchanger and reactor module includes a heat exchanger channel, and a reactor channel which is thermally coupled to the heat exchanger channel. The reactor channel includes a layer of catalyst material that is configured to produce hydrogen by endothermic catalytic decomposition of ammonia, which flows through the reactor channel, using thermal energy that is absorbed by the reactor channel from the heat exchanger channel.

18 Claims, 10 Drawing Sheets

(56) References Cited

U.S. PATENT DOCUMENTS

| | | | |
|---|---|---|---|
| 3,352,716 A * | 11/1967 | Lindstrom | C01B 3/047 62/48.1 |
| 3,689,042 A | 9/1972 | Pere et al. | |
| 3,807,963 A * | 4/1974 | Smith | C07C 5/333 422/651 |
| 4,155,986 A | 5/1979 | Gladden | |
| 5,055,282 A | 10/1991 | Shikada et al. | |
| 5,912,198 A | 6/1999 | Feitelberg et al. | |
| 6,350,540 B1 | 2/2002 | Sugita et al. | |
| 6,555,084 B2 | 4/2003 | Ohtsuka | |
| 6,936,363 B2 | 8/2005 | Kordesch et al. | |
| 6,984,750 B2 | 1/2006 | Chaturvedi et al. | |
| 7,071,239 B2 | 7/2006 | Ortego, Jr. et al. | |
| 7,157,166 B2 | 1/2007 | Vajo | |
| 7,160,360 B2 | 1/2007 | Wu et al. | |
| 7,220,699 B2 | 5/2007 | Chellappa | |
| 7,276,214 B2 | 10/2007 | Johnston et al. | |
| 7,282,467 B2 | 10/2007 | Huisman et al. | |
| 7,294,425 B2 | 11/2007 | Hodge et al. | |
| 7,374,838 B2 | 5/2008 | Gallagher | |
| 7,439,273 B2 | 10/2008 | Woods et al. | |
| 7,569,294 B2 | 8/2009 | Graham et al. | |
| 7,662,435 B2 | 2/2010 | Chellappa et al. | |
| 7,670,587 B2 | 3/2010 | Porter et al. | |
| 7,731,918 B2 | 6/2010 | Chellappa | |
| 7,763,086 B2 | 7/2010 | Woods et al. | |
| 7,803,496 B2 | 9/2010 | Koyama et al. | |
| 7,862,631 B2 | 1/2011 | Burch et al. | |
| 8,043,767 B2 | 10/2011 | Benson | |
| 8,166,926 B2 | 5/2012 | Sasaki et al. | |
| 8,440,357 B2 | 5/2013 | Hossain et al. | |
| 8,617,265 B2 | 12/2013 | Chellappa | |
| 8,664,148 B2 | 3/2014 | Brey et al. | |
| 8,795,918 B2 | 8/2014 | Shimomura | |
| 8,877,407 B2 | 11/2014 | Akiyama | |
| 8,900,420 B2 | 12/2014 | Veeraraghavan et al. | |
| 8,916,300 B2 | 12/2014 | McElroy et al. | |
| 8,921,000 B2 | 12/2014 | Takeshita et al. | |
| 8,932,773 B2 | 1/2015 | Nakanishi et al. | |
| 8,961,923 B2 | 2/2015 | Grannell et al. | |
| 9,023,542 B2 | 5/2015 | Kaneko et al. | |
| 9,105,891 B2 | 8/2015 | Nagaosa | |
| 9,163,541 B2 | 10/2015 | Kumagai et al. | |
| 9,172,106 B2 | 10/2015 | Berning | |
| 9,187,321 B2 | 11/2015 | Fuse et al. | |
| 9,236,624 B2 | 1/2016 | Page et al. | |
| 9,341,111 B2 | 5/2016 | Hikazudani et al. | |
| 9,359,270 B2 | 6/2016 | Daly et al. | |
| 9,359,271 B2 | 6/2016 | LeViness et al. | |
| 9,506,400 B2 | 11/2016 | Tange et al. | |
| 9,670,063 B2 | 6/2017 | David et al. | |
| 9,737,869 B2 | 8/2017 | Kamata et al. | |
| 9,819,040 B2 | 11/2017 | Littau | |
| 9,861,951 B2 | 1/2018 | Vu | |
| 9,884,770 B2 | 2/2018 | Takeshima | |
| 9,896,332 B2 | 2/2018 | Hikazudani et al. | |
| 9,958,211 B2 | 5/2018 | Vernon | |
| 10,166,526 B2 | 1/2019 | Hamada et al. | |
| 10,322,940 B2 | 6/2019 | Hosono et al. | |
| 10,449,506 B2 | 10/2019 | Kamata et al. | |
| 10,450,192 B2 | 10/2019 | Finkelshtain et al. | |
| 10,478,805 B2 | 11/2019 | Hinokuma et al. | |
| 10,596,551 B2 | 3/2020 | Sharma et al. | |
| 10,830,125 B2 | 11/2020 | Pomar | |
| 10,875,002 B2 | 12/2020 | Patel et al. | |
| 10,906,804 B2 | 2/2021 | Li et al. | |
| 10,914,212 B1 | 2/2021 | Bargman et al. | |
| 10,919,025 B2 | 2/2021 | Li et al. | |
| 10,961,890 B2 | 3/2021 | Sung et al. | |
| 11,014,809 B2 | 5/2021 | Miura | |
| 11,038,181 B2 | 6/2021 | Kandlikar | |
| 11,065,591 B2 | 7/2021 | Speth et al. | |
| 11,084,012 B2 | 8/2021 | Jiang et al. | |
| 11,084,719 B2 | 8/2021 | Andersen et al. | |
| 11,110,434 B2 | 9/2021 | Jiang et al. | |
| 11,117,809 B2 | 9/2021 | Hojlund Nielsen | |
| 11,148,955 B2 | 10/2021 | Gorval et al. | |
| 11,149,662 B2 | 10/2021 | Heggen | |
| 11,156,168 B2 | 10/2021 | Nose et al. | |
| 11,161,739 B2 | 11/2021 | Gray | |
| 11,167,732 B1 | 11/2021 | Cohen et al. | |
| 11,287,089 B1 | 3/2022 | Cohen et al. | |
| 11,305,250 B2 | 4/2022 | Verykios et al. | |
| 11,309,568 B2 | 4/2022 | Achrai et al. | |
| 11,374,246 B2 | 6/2022 | Luo et al. | |
| 11,437,637 B2 | 9/2022 | Ikemoto et al. | |
| 11,465,114 B2 | 10/2022 | Jo et al. | |
| 11,539,063 B1 | 12/2022 | Choi et al. | |
| 2002/0028171 A1 | 3/2002 | Goetsch et al. | |
| 2003/0015093 A1 | 1/2003 | Wegeng et al. | |
| 2003/0189037 A1 | 10/2003 | Kochman et al. | |
| 2004/0261379 A1 * | 12/2004 | Bruun | F28F 9/0278 55/418 |
| 2006/0112636 A1 | 6/2006 | Chellappa et al. | |
| 2006/0121322 A1 | 6/2006 | Haas et al. | |
| 2007/0051041 A1 | 3/2007 | Genkin et al. | |
| 2007/0190389 A1 | 8/2007 | Hinsenkamp et al. | |
| 2007/0221060 A1 | 9/2007 | Song | |
| 2007/0254204 A1 | 11/2007 | Shin et al. | |
| 2008/0145733 A1 | 6/2008 | Asazawa et al. | |
| 2008/0171255 A1 | 7/2008 | Brantley et al. | |
| 2010/0060404 A1 | 3/2010 | Raiser et al. | |
| 2011/0136027 A1 | 6/2011 | Chen et al. | |
| 2012/0088168 A1 | 4/2012 | Pledger | |
| 2012/0121488 A1 | 5/2012 | Comrie | |
| 2012/0148925 A1 | 6/2012 | Grannell et al. | |
| 2013/0037122 A1 | 2/2013 | Nager et al. | |
| 2013/0140295 A1 | 6/2013 | Yoshioka et al. | |
| 2013/0189603 A1 | 7/2013 | Sakamoto et al. | |
| 2014/0105816 A1 | 4/2014 | Grannell et al. | |
| 2014/0287911 A1 | 9/2014 | Wang et al. | |
| 2014/0356738 A1 | 12/2014 | Bell et al. | |
| 2016/0167962 A1 | 6/2016 | Hikazudani et al. | |
| 2016/0375985 A1 | 12/2016 | Ribarov et al. | |
| 2017/0070088 A1 | 3/2017 | Berntsen et al. | |
| 2018/0015443 A1 | 1/2018 | Finkelshtain et al. | |
| 2018/0230006 A1 * | 8/2018 | Finkelshtain | C01B 3/047 |
| 2018/0261856 A1 | 9/2018 | Akashi et al. | |
| 2020/0032676 A1 | 1/2020 | Nose et al. | |
| 2020/0062590 A1 | 2/2020 | McCullough et al. | |
| 2020/0099072 A1 | 3/2020 | Ikemoto et al. | |
| 2020/0123006 A1 | 4/2020 | Speth et al. | |
| 2020/0197889 A1 | 6/2020 | Jo et al. | |
| 2020/0266469 A1 | 8/2020 | Kojima et al. | |
| 2020/0269208 A1 | 8/2020 | Way et al. | |
| 2020/0346937 A1 | 11/2020 | Beach et al. | |
| 2020/0388869 A1 | 12/2020 | Galbiati | |
| 2020/0398240 A1 | 12/2020 | Jiang et al. | |
| 2020/0403258 A1 | 12/2020 | Luo et al. | |
| 2021/0001311 A1 | 1/2021 | Wu et al. | |
| 2021/0113983 A1 | 4/2021 | Mortensen et al. | |
| 2021/0178377 A1 | 6/2021 | Khatiwada et al. | |
| 2021/0178378 A1 | 6/2021 | Khatiwada et al. | |
| 2021/0234179 A1 | 7/2021 | Klein et al. | |
| 2021/0237046 A1 | 8/2021 | Gascon et al. | |
| 2021/0245139 A1 | 8/2021 | Seabaugh et al. | |
| 2021/0395082 A1 | 12/2021 | Iwai | |
| 2021/0395101 A1 | 12/2021 | Giddey et al. | |
| 2021/0395883 A1 | 12/2021 | Dip | |
| 2022/0002151 A1 | 1/2022 | Katikaneni et al. | |
| 2022/0090576 A1 | 3/2022 | Sia | |
| 2022/0119250 A1 | 4/2022 | Shin et al. | |
| 2022/0154646 A1 | 5/2022 | Araki et al. | |
| 2022/0158202 A1 | 5/2022 | Nishibayashi et al. | |
| 2022/0162490 A1 | 5/2022 | Jo et al. | |
| 2022/0162989 A1 | 5/2022 | Cocks et al. | |
| 2022/0162999 A1 | 5/2022 | Cocks et al. | |
| 2022/0163002 A1 | 5/2022 | Takeuchi | |
| 2022/0195919 A1 | 6/2022 | Akbari et al. | |
| 2022/0205415 A1 | 6/2022 | Takeuchi et al. | |
| 2022/0212172 A1 | 7/2022 | Song et al. | |
| 2022/0234886 A1 | 7/2022 | Yamazaki et al. | |
| 2022/0347644 A1 | 11/2022 | Jo et al. | |
| 2022/0362748 A1 | 11/2022 | Jo et al. | |

(56) References Cited

U.S. PATENT DOCUMENTS

| | | |
|---|---|---|
| 2022/0364505 A1 | 11/2022 | Kim et al. |
| 2022/0389864 A1 | 12/2022 | Jo et al. |
| 2022/0395810 A1 | 12/2022 | Sheludko et al. |
| 2022/0395812 A1 | 12/2022 | Sheludko et al. |
| 2022/0403775 A1 | 12/2022 | Jo et al. |
| 2023/0001377 A1 | 1/2023 | Jo et al. |
| 2023/0053549 A1 | 2/2023 | Choi et al. |
| 2023/0055180 A1 | 2/2023 | Choi et al. |
| 2023/0055949 A1 | 2/2023 | Choi et al. |
| 2023/0118083 A1 | 4/2023 | Jo et al. |
| 2023/0123946 A1 | 4/2023 | Mann |

FOREIGN PATENT DOCUMENTS

| | | |
|---|---|---|
| CA | 3132213 A1 | 9/2020 |
| CN | 101172575 A | 5/2008 |
| CN | 106517092 A | 3/2017 |
| CN | 210528460 U | 5/2020 |
| CN | 111332447 A | 6/2020 |
| CN | 210973870 U | 7/2020 |
| CN | 112901339 A | 6/2021 |
| CN | 113048469 A | 6/2021 |
| CN | 113058595 A | 7/2021 |
| CN | 113058610 A | 7/2021 |
| CN | 113074046 A | 7/2021 |
| CN | 113181957 A | 7/2021 |
| CN | 213651846 U | 7/2021 |
| CN | 213726378 U | 7/2021 |
| CN | 213738601 U | 7/2021 |
| CN | 113198476 A | 8/2021 |
| CN | 113202660 A | 8/2021 |
| CN | 113289693 A | 8/2021 |
| CN | 213943062 U | 8/2021 |
| CN | 213976966 U | 8/2021 |
| CN | 214059903 U | 8/2021 |
| CN | 214060653 U | 8/2021 |
| CN | 113332987 A | 9/2021 |
| CN | 113363545 A | 9/2021 |
| CN | 113451615 A | 9/2021 |
| CN | 113540541 A | 10/2021 |
| CN | 214399815 U | 10/2021 |
| CN | 214406970 U | 10/2021 |
| CN | 214406981 U | 10/2021 |
| CN | 214486811 U | 10/2021 |
| CN | 113604813 A | 11/2021 |
| CN | 113666334 A | 11/2021 |
| CN | 113694922 A | 11/2021 |
| CN | 214611516 U | 11/2021 |
| CN | 214716493 U | 11/2021 |
| CN | 214753865 U | 11/2021 |
| CN | 214880199 U | 11/2021 |
| CN | 214959115 U | 11/2021 |
| CN | 214959751 U | 11/2021 |
| CN | 113775924 A | 12/2021 |
| CN | 113788134 A | 12/2021 |
| CN | 113864783 A | 12/2021 |
| CN | 214990264 U | 12/2021 |
| CN | 215002336 U | 12/2021 |
| CN | 215066412 U | 12/2021 |
| CN | 215364901 U | 12/2021 |
| CN | 113896168 A | 1/2022 |
| CN | 215578650 U | 1/2022 |
| CN | 215592611 U | 1/2022 |
| DE | 102010006153 A1 | 8/2011 |
| DE | 102017011833 A1 | 6/2019 |
| DK | 201900097 U3 | 3/2020 |
| EP | 2070141 B1 | 12/2012 |
| EP | 2774202 B1 | 8/2015 |
| EP | 1868941 B9 | 2/2017 |
| EP | 3028990 B1 | 8/2017 |
| EP | 3059206 B1 | 8/2017 |
| EP | 3258524 A1 | 12/2017 |
| EP | 2715847 B1 | 1/2019 |
| EP | 3448803 A1 | 3/2019 |
| EP | 3632543 A1 | 4/2020 |
| EP | 2332646 B1 | 7/2020 |
| EP | 3409354 B1 | 9/2021 |
| EP | 3878806 A1 | 9/2021 |
| EP | 3015164 B1 | 2/2022 |
| EP | 3981054 A1 | 4/2022 |
| EP | 3981739 A1 | 4/2022 |
| EP | 4017947 A1 | 6/2022 |
| IN | 394309 B | 4/2022 |
| JP | 2005145748 A | 6/2005 |
| JP | 3940551 B2 | 7/2007 |
| JP | 2008153091 A | 7/2008 |
| JP | 2009035458 A | 2/2009 |
| JP | 2010195642 A | 9/2010 |
| JP | 4666301 B2 | 4/2011 |
| JP | 2012005926 A | 1/2012 |
| JP | 5263677 B2 | 8/2013 |
| JP | 5272762 B2 | 8/2013 |
| JP | 5272767 B2 | 8/2013 |
| JP | 5321230 B2 | 10/2013 |
| JP | 5346693 B2 | 11/2013 |
| JP | 5352343 B2 | 11/2013 |
| JP | 5371542 B2 | 12/2013 |
| JP | 5380233 B2 | 1/2014 |
| JP | 5389525 B2 | 1/2014 |
| JP | 5426201 B2 | 2/2014 |
| JP | 5430224 B2 | 2/2014 |
| JP | 5755160 B2 | 7/2015 |
| JP | 5810710 B2 | 11/2015 |
| JP | 5811494 B2 | 11/2015 |
| JP | 2016131065 A | 7/2016 |
| JP | 2016198720 A | 12/2016 |
| JP | 6308844 B2 | 4/2018 |
| JP | 2018076214 A | 5/2018 |
| JP | 6381131 B2 | 8/2018 |
| JP | 6482022 B2 | 3/2019 |
| JP | 2019053854 A | 4/2019 |
| JP | 2019177381 A | 10/2019 |
| JP | 6604501 B2 | 11/2019 |
| JP | 2020040860 A | 3/2020 |
| JP | WO2018221701 A1 | 4/2020 |
| JP | 6706277 B2 | 6/2020 |
| JP | 6778370 B2 | 11/2020 |
| JP | 6789080 B2 | 11/2020 |
| JP | 2020183337 A | 11/2020 |
| JP | 2020196646 A | 12/2020 |
| JP | 2020197169 A | 12/2020 |
| JP | 6850449 B2 | 3/2021 |
| JP | 6866570 B2 | 4/2021 |
| JP | 2021095300 A | 6/2021 |
| JP | 2021110463 A | 8/2021 |
| JP | 6929045 B2 | 9/2021 |
| JP | 6938186 B2 | 9/2021 |
| JP | 2021127861 A | 9/2021 |
| JP | 2021128904 A | 9/2021 |
| JP | 2021130100 A | 9/2021 |
| JP | 2021161006 A | 10/2021 |
| JP | 2021161921 A | 10/2021 |
| JP | 2021173232 A | 11/2021 |
| JP | 6996181 B2 | 2/2022 |
| JP | 7036318 B2 | 3/2022 |
| JP | 7074103 B2 | 5/2022 |
| JP | 7076930 B2 | 5/2022 |
| JP | 7079068 B2 | 6/2022 |
| KR | 20040039951 A | 5/2004 |
| KR | 101173456 B1 | 8/2012 |
| KR | 101388755 B1 | 4/2014 |
| KR | 101768078 B1 | 8/2017 |
| KR | 102159237 B1 | 9/2020 |
| KR | 102174654 B1 | 11/2020 |
| KR | 102219136 B1 | 2/2021 |
| KR | 102247199 B1 | 5/2021 |
| KR | 102254196 B1 | 5/2021 |
| KR | 102256907 B1 | 5/2021 |
| KR | 102303094 B1 | 9/2021 |
| KR | 102304381 B1 | 9/2021 |
| KR | 102304406 B1 | 9/2021 |
| KR | 102309466 B1 | 10/2021 |
| KR | 102315763 B1 | 10/2021 |
| KR | 20210136381 A | 11/2021 |

(56) References Cited

FOREIGN PATENT DOCUMENTS

| | | |
|---|---|---|
| KR | 102335322 B1 | 12/2021 |
| KR | 20220005829 A | 1/2022 |
| KR | 102392578 B1 | 5/2022 |
| KR | 20220057717 A | 5/2022 |
| KR | 20220093960 A | 7/2022 |
| KR | 20220094475 A | 7/2022 |
| NL | 2017963 B1 | 6/2018 |
| TW | I274604 B | 3/2007 |
| WO | WO-9840311 A1 | 9/1998 |
| WO | WO-0183108 A1 | 11/2001 |
| WO | WO-0187770 A1 | 11/2001 |
| WO | WO-0208117 A1 | 1/2002 |
| WO | WO-02071451 A2 | 9/2002 |
| WO | WO-2005091418 A2 | 9/2005 |
| WO | WO-2005099885 A1 | 10/2005 |
| WO | WO-2006113451 A2 | 10/2006 |
| WO | WO-2006134419 A2 | 12/2006 |
| WO | WO-2007119262 A2 | 10/2007 |
| WO | WO-2008024089 A2 | 2/2008 |
| WO | WO-2008088319 A2 | 7/2008 |
| WO | WO-2009098452 A2 | 8/2009 |
| WO | WO-2009116679 A1 | 9/2009 |
| WO | WO-2010116874 A3 | 4/2011 |
| WO | WO-2011107279 A1 | 9/2011 |
| WO | WO-2012039183 A1 | 3/2012 |
| WO | WO-2013057473 A1 | 4/2013 |
| WO | WO-2013063169 A1 | 5/2013 |
| WO | WO-2013122849 A1 | 8/2013 |
| WO | WO-2013142123 A1 | 9/2013 |
| WO | WO-2014054277 A1 | 4/2014 |
| WO | WO-2015044691 A1 | 4/2015 |
| WO | WO-2015074127 A1 | 5/2015 |
| WO | WO-2016013652 A1 | 1/2016 |
| WO | WO-2016051633 A1 | 4/2016 |
| WO | WO-2017099143 A1 | 6/2017 |
| WO | WO-2017186614 A1 | 11/2017 |
| WO | WO-2018185663 A1 | 10/2018 |
| WO | WO-2018198635 A1 | 11/2018 |
| WO | WO-2019032591 A1 | 2/2019 |
| WO | WO-2019038251 A1 | 2/2019 |
| WO | WO-2021063795 A1 | 4/2021 |
| WO | WO-2021156626 A1 | 8/2021 |
| WO | WO-2021168226 A1 | 8/2021 |
| WO | WO-2021172545 A1 | 9/2021 |
| WO | WO-2021177359 A1 | 9/2021 |
| WO | WO-2021221943 A1 | 11/2021 |
| WO | WO-2021225254 A1 | 11/2021 |
| WO | WO-2021228428 A1 | 11/2021 |
| WO | WO-2021241841 A1 | 12/2021 |
| WO | WO-2021260108 A1 | 12/2021 |
| WO | WO-2022010178 A1 | 1/2022 |
| WO | WO-2022055225 A1 | 3/2022 |
| WO | WO-2021257944 A9 | 4/2022 |
| WO | WO-2022070597 A1 | 4/2022 |
| WO | WO-2022076341 A1 | 4/2022 |
| WO | WO-2022079435 A1 | 4/2022 |
| WO | WO-2022106568 A1 | 5/2022 |
| WO | WO-2022119376 A1 | 6/2022 |
| WO | WO-2022129294 A1 | 6/2022 |
| WO | WO-2022153059 A1 | 7/2022 |
| WO | WO-2022153060 A1 | 7/2022 |
| WO | WO-2022153061 A1 | 7/2022 |
| WO | WO-2022153718 A1 | 7/2022 |
| WO | WO-2022153719 A1 | 7/2022 |
| WO | WO-2022153720 A1 | 7/2022 |
| WO | WO-2022241260 A1 | 11/2022 |
| WO | WO-2022261488 A1 | 12/2022 |
| WO | WO-2023022995 A1 | 2/2023 |

OTHER PUBLICATIONS

S. Kumar, "Heat Exchanger—Types, Working, Construction," https://marinerspoint.in/working-of-heat-exchanger/2020/11/, Nov. 4, 2020, 9 pages.

M. Gallucci, "The Ammonia Solution: Ammonia Engines and Fuel Cells in Cargo Ships Could Slash Their Carbon Emissions," IEEE Spectrum, Mar. 2021, pp. 45-50.

Co-pending U.S. Appl. No. 17/366,633, inventors Kim; Hyunho et al., filed Jul. 2, 2021.

Co-pending U.S. Appl. No. 17/589,287, inventors Choi; Jongwon et al., filed Jan. 31, 2022.

Co-pending U.S. Appl. No. 17/886,219, inventors Sheludko; Boris et al., filed Aug. 11, 2022.

Co-pending U.S. Appl. No. 17/886,307, inventors Shelduko; Boris et al., filed Aug. 11, 2022.

Co-pending U.S. Appl. No. 17/889,256, inventors Jo; Young Suk et al., filed Aug. 16, 2022.

Co-pending U.S. Appl. No. 17/889,260, inventors Jo; Young Suk et al., filed Aug. 16, 2022.

Co-pending U.S. Appl. No. 17/968,109, inventors Choi; Jongwon et al., filed Oct. 18, 2022.

Co-pending U.S. Appl. No. 17/968,125, inventors Choi; Jongwon et al., filed Oct. 18, 2022.

Co-pending U.S. Appl. No. 17/968,211, inventors Choi; Jongwon et al., filed Oct. 18, 2022.

Hansgen, et al. Using first principles to predict bimetallic catalysts for the ammonia decomposition reaction. Nat Chem. Jun. 2010;2(6):484-489. doi: 10.1038/nchem.626. Epub Apr. 25, 2010.

International search report with written opinion dated Sep. 21, 2022 for PCT/US2022/029264.

Notice of Allowance dated Aug. 11, 2022 for U.S. Appl. No. 17/589,287.

Notice of Allowance dated Sep. 14, 2022 for U.S. Appl. No. 17/589,287.

Office action dated Jun. 2, 2022 for U.S. Appl. No. 17/589,287.

Co-pending U.S. Appl. No. 17/501,090, inventor Mann; Maxwell Spencer, filed Oct. 14, 2021.

Co-pending U.S. Appl. No. 17/974,885, inventors Jo; Young Suk et al., filed Oct. 27, 2022.

Co-pending U.S. Appl. No. 17/974,997, inventors Jo; Young Suk et al., filed Oct. 27, 2022.

Co-pending U.S. Appl. No. 17/975,184, inventors Jo; Young Suk et al., filed Oct. 27, 2022.

Co-pending U.S. Appl. No. 18/065,915, inventors Sheludko; Boris et al., filed Dec. 14, 2022.

Co-pending U.S. Appl. No. 18/066,163, inventors Sheludko; Boris et al., filed Dec. 14, 2022.

Co-pending U.S. Appl. No. 18/081,512, inventors Jo; Young Suk et al., filed Dec. 14, 2022.

Office action dated Jan. 27, 2023 for U.S. Appl. No. 17/974,885.

Co-pending U.S. Appl. No. 18/133,388, inventors Sheludko; Boris et al., filed Apr. 11, 2023.

Notice of Allowance dated Jun. 1, 2023 for U.S. Appl. No. 17/974,885.

Notice of Allowance dated Jun. 12, 2023 for U.S. Appl. No. 18/081,512.

Office action dated May 12, 2023 for U.S. Appl. No. 17/889,256.

Office action dated May 19, 2023 for U.S. Appl. No. 18/081,512.

Office action dated Jun. 15, 2023 for U.S. Appl. No. 17/889,260.

Metkemeijer, et al. Ammonia as a feedstock for a hydrogen fuel cell; reformer and fuel cell behaviour. Journal of Power Sources. 49 (1994): 271-282.

Office action dated Feb. 15, 2023 for U.S. Appl. No. 17/975,184.

Office action dated Mar. 9, 2023 for U.S. Appl. No. 17/366,633.

Translation of DE102010006153A1 (Year: 2011).

* cited by examiner

200

700

US 11,724,245 B2

INTEGRATED HEAT EXCHANGER REACTORS FOR RENEWABLE FUEL DELIVERY SYSTEMS

BACKGROUND

There are concerted efforts to reduce greenhouse-gas emissions and protect against climate change. Such efforts currently include continuing research and development with regard to renewable energy sources for electrical power generation systems and fuel power systems for operating vehicles and, in particular, the generation and utilization of carbon-neutral and carbon-free fuels produced from renewable sources. One promising technology for renewable energy involves the use of ammonia as a green fuel and hydrogen as a fuel source. However, as with all potential renewable energy sources, the effective utilization of a given renewable energy source is not trivial, since the pathway for effectively utilizing a renewable energy source must take into consideration critical aspects of such use. For example, such considerations include, but are not limited to, the ability to mass produce the renewable energy resource (without adversely affecting the environment through such production), the ability to safely and efficiently store the renewable energy resource, the ability to efficiently and effectively generate the power that is needed for a given application (e.g., vehicular application) using the renewable energy source, etc.

SUMMARY

Embodiments of the disclosure include integrated heat exchanger reactor modules, and renewable fuel delivery systems which implement integrated heat exchanger reactor modules which are configured for converting ammonia to hydrogen fuel.

In one exemplary embodiment, an apparatus includes an integrated heat exchanger and reactor module. The integrated heat exchanger and reactor module comprises a heat exchanger channel, and a reactor channel which is thermally coupled to the heat exchanger channel. The reactor channel comprises a layer of catalyst material that is configured to produce hydrogen by endothermic catalytic decomposition of ammonia, which flows through the reactor channel, using thermal energy that is absorbed by the reactor channel from the heat exchanger channel.

In another exemplary embodiment, a system comprises a storage tank, a combustion heater, and an integrated heat exchange and reactor module. The storage tank is configured to store ammonia in liquid form. The combustion heater is configured to generate heated combustion gas. The integrated heat exchanger and reactor module comprises a heat exchanger channel, and a reactor channel which is thermally coupled to the heat exchanger channel. The reactor channel comprises a layer of catalyst material that is configured to produce hydrogen by endothermic catalytic decomposition of ammonia, which flows from the storage tank through the reactor channel, using thermal energy that is absorbed by the reactor channel from the heat exchanger channel. The heat exchanger channel is configured to receive heated combustion gas, which is generated by the combustion heater, and which flows through the heat exchanger channel to provide the thermal energy that is absorbed by the reactor channel from the heat exchanger channel.

In another exemplary embodiment, a method is provided to fabricate a reactor channel element. A surface cleaning process is performed to remove impurities from a surface of the reactor channel element using at least one of a chemical cleaning process and a physical cleaning process. At least one of a chemical surface treatment process and a physical surface treatment process is performed on the surface of a reactor channel element to increase an adhesion of the surface of the reactor channel element to a catalyst material. A layer of catalyst material is deposited on the treated surface of the reactor channel element. A thermal treatment process is performed to thermally treat the layer of catalyst material.

Other embodiments will be described in the following detailed description of exemplary embodiments, which is to be read in conjunction with the accompanying figures.

BRIEF DESCRIPTION OF THE DRAWINGS

FIGS. 5A, 5B, 5C, and 5D are schematic views of an integrated heat exchanger reactor module, according to an exemplary embodiment of the disclosure, wherein:

FIG. 5A is a schematic top view of the integrated heat exchanger reactor module;

FIG. 5B is a schematic cross-sectional view of the integrated heat exchanger reactor module taken along line 5B-5B shown in FIG. 5A;

FIG. 5C is a schematic cross-sectional plan view of a heat exchanger layer taken along line 5C-5C in FIG. 5B; and FIG. 5D is a schematic cross-sectional plan view of a reactor channel layer taken along line 5D-5D in FIG. 5B.

DETAILED DESCRIPTION

Figure 1:
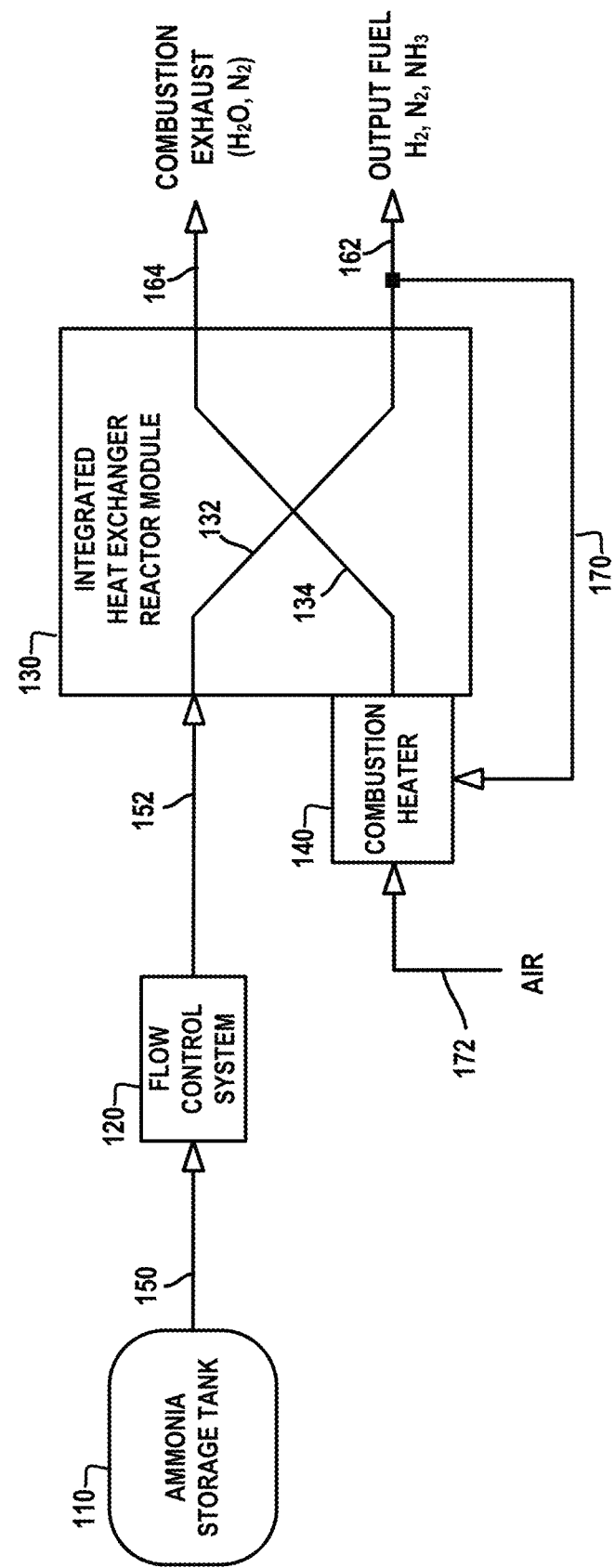
FIG. 1 schematically illustrates a renewable fuel delivery system comprising an integrated heat exchanger reactor module, according to an exemplary embodiment of the disclosure.

Embodiments of the disclosure will now be described in further detail with regard to integrated heat exchanger reactor modules, and renewable fuel delivery systems which implement integrated heat exchanger reactor modules which are configured for converting ammonia to hydrogen fuel. It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration". Any embodiment or design described herein as "exemplary" is not to be construed as preferred or advantageous over other embodiments or designs.

For illustrative purposes, exemplary embodiments of the disclosure will be discussed in the context of renewable fuel delivery systems comprising integrated heat exchanger reactor modules that are configured for reforming liquid ammonia ($NH_3$) using a catalyst to produce hydrogen ($H_2$) fuel. In some embodiments, the hydrogen fuel is utilized in combination with the ammonia fuel for vehicles with an ammonia internal combustion engine (A-ICE). In other embodiments, the hydrogen fuel is utilized for vehicles with a hydrogen internal combustion engine (H-ICE), or vehicles with an electric engine that is powered by a hydrogen fuel cell. The use of ammonia as a renewable fuel, or as a source (hydrogen carrier) for producing hydrogen for vehicular application provides many advantages.

For example, ammonia can be mass produced using well known industrial processes, which do not generate undesirable byproducts that can adversely affect the environment. For example, ammonia can be mass produced with industrial systems that implement the Haber-Bosch process (an artificial nitrogen fixation process). The Haber-Bosch process (also referred to as Haber ammonia process, or synthetic ammonia process) involves directly synthesizing ammonia from hydrogen and nitrogen: $2NH_3 \leftrightarrow N_2 + 3H_2$. More specifically, the synthetic ammonia process involves converting atmospheric nitrogen ($N_2$) to ammonia ($NH_3$) by a reaction with hydrogen (e.g., $H_2$ produced or obtained by electrolysis) using a metal catalyst (e.g., iron) under suitable temperatures and pressures, while ammonia is removed from the batch as soon as it is formed to maintain an equilibrium that favors ammonia formation. Advantageously, the production of ammonia using the Haber-Bosch process can be powered by renewable energy sources (e.g., solar photovoltaic or solar-thermal), which makes the production process environmentally safe and friendly, as $N_2$ is the only byproduct and there is no further emission of $CO_2$.

Another advantage associated with using ammonia as a renewable fuel or a source for hydrogen fuel is that ammonia (as a hydrogen carrier) can be readily stored and transported at relatively standard conditions (0.8 MPa, 20° C. in liquid form). In addition, ammonia has a relatively high hydrogen content (17.7 wt %, 120 grams of $H_2$ per liter of liquid ammonia) and, thus, liquid ammonia provides a relatively high $H_2$ storage capacity. Compared to other fuel types such as hydrogen, ammonia exhibits a favorable volumetric density in view of its gravimetric density. Further, in comparison to other types of fuel (e.g., methane, propane, methanol, ethanol, gasoline, E-10 gasoline, JP-8 jet fuel, or diesel), the use of ammonia as a fuel does not produce harmful emissions such as $NO_x$ or $CO_2$. Thus, the use of ammonia as an energy carrier allows the exemplary vehicular fuel power systems as disclosed herein to leverage the benefits of ammonia and/or hydrogen fuel (e.g., environmentally safe and high gravimetric energy density) once the ammonia is broken down into hydrogen, while taking advantage of (1) ammonia's greater volumetric density compared to hydrogen and (ii) the ability to transport ammonia at standard temperatures and pressures without requiring complex and highly pressurized storage vessels like those typically used for storing and transporting hydrogen.

FIG. 1 schematically illustrates a renewable fuel delivery system 100 comprising an integrated heat exchanger reactor module, according to an exemplary embodiment of the disclosure. In particular, the renewable fuel delivery system 100 comprises a storage tank 110, a flow control system 120, an integrated heat exchanger reactor module 130, and a combustion heater 140. The integrated heat exchanger reactor module 130 comprises reactor channels 132 and heat exchanger channels 134. The reactor channels 132 are coated with catalyst material and are configured to produce hydrogen by endothermic catalytic decomposition of ammonia (ammonia cracking). The heat exchanger channels 134 are in thermal communication with the reactor channels 132, and are configured to provide the thermal energy needed for the endothermic catalytic decomposition of ammonia by the reactor channels 132.

In an exemplary embodiment, the storage tank 110 is configured to store liquid ammonia. The integrated heat exchanger reactor module 130 is in fluid communication with the storage tank 110 through fuel lines 150 and 152 and the flow control system 120. The flow control system 120 is configured to control/regulate the flow of liquid ammonia from the storage tank 110 to an input of the integrated heat exchanger reactor module 130. In particular, in some embodiments, the fuel line 152 delivers liquid phase or gas phase or liquid-gas two phase ammonia to an ammonia input manifold of the integrated heat exchanger reactor module 130, wherein the ammonia input manifold distributes the input liquid ammonia to the reactor channels 132. The reactor channels 132 are coupled to a fuel output manifold of the integrated heat exchanger reactor module 130, which delivers an output fuel stream (resulting from the ammonia reforming reaction) to an output fuel line 162. The output fuel stream comprises a mixture of hydrogen ($H_2$) and nitrogen ($N_2$) resulting from the ammonia reforming process, as well as residual (unreacted) ammonia ($NH_3$).

The combustion heater 140 is configured to provide the thermal energy needed for the endothermic catalytic decomposition (cracking) of ammonia which is performed within the reactor channels 132. In some embodiments, the combustion heater 140 comprises an internal combustion chamber which receives as input combustion fuel (via a fuel line 170) and air (via air intake line 172), and ignites an air/fuel mixture to generate heated combustion gas. The combustion heater 140 delivers heated combustion gas to a combustion gas input manifold of the integrated heat exchanger reactor module 130, which distributes the heated combustion gas to the heat exchanger channels 134. As the heated combustion gas flows through the heat exchanger channels 134, the reactor channels 132 absorb heat from the heated combustion gas, which is needed for the endothermic ammonia cracking reaction. The heat exchanger channels 134 are coupled to a combustion exhaust gas output manifold of the integrated heat exchanger reactor module 130, which outputs combustion exhaust gas to an output exhaust line 164. In some embodiments, the combustion exhaust gas comprises water vapor ($H_2O$) and nitrogen ($N_2$) gas, although the composition of the combustion exhaust will depend on the combustion fuel that is used.

In some embodiments, as shown in FIG. 1, the fuel for the combustion heater 140 is drawn from the combustion fuel line 170 which is coupled to the output fuel line 162. In this regard, the combustion heater 140 is configured to receive a portion of the fuel output from the integrated heat exchanger reactor module 130, and combust the received fuel to generate the heated combustion gas that flows through the heat exchanger channels 134. In some embodiments, the flow of combustion fuel in the combustion fuel line 170 is controlled/regulated using any suitable combustion fuel flow control system including, but not limited to, a constant pressure fuel pump, a solenoid valve, a regulator assembly, pressure switches, temperature switches, etc.

In some embodiments, the combustion heater 140 comprises at least one fuel nozzle which is coupled to the combustion fuel line 170, and a spark plug and ignition element. The fuel nozzle is configured to spray combustion fuel into the internal combustion chamber, wherein the fuel spray is ignited by a continuous spark ignition of the spark plug. In some embodiments, the combustion heater 140 comprises an electronic ignition to provide continuous spark ignition of the spark plug, when the electronic ignition is activated.

The combustion heater 140 implements a combustion air blower system which is configured to control the flow of heated combustion gas through the internal combustion chamber of the combustion heater 140, and into the combustion gas input manifold and through the heat exchanger channels 134 of the integrated heat exchanger reactor module 130. The combustion air blower system may be an integral component of the combustion heater 140, or a separate component. In some embodiments, the combustion air blower is configured to control the quantity (flow rate) and pressure of air flow through the combustion heater 140 and through the heat exchanger channels 134 of the integrated heat exchanger reactor module 130. The air intake line 172 is coupled to one or more ambient air input ports. In some embodiments, the air intake line 172 is connected in-line with the combustion air blower. In this instance, the combustion air blower system would be configured to control the quantity and pressure of ambient air that is input to the combustion heater 140, as well as control the flow of heated combustion gas through the heat exchanger channels 134 of the integrated heat exchanger reactor module 130.

Figure 2:
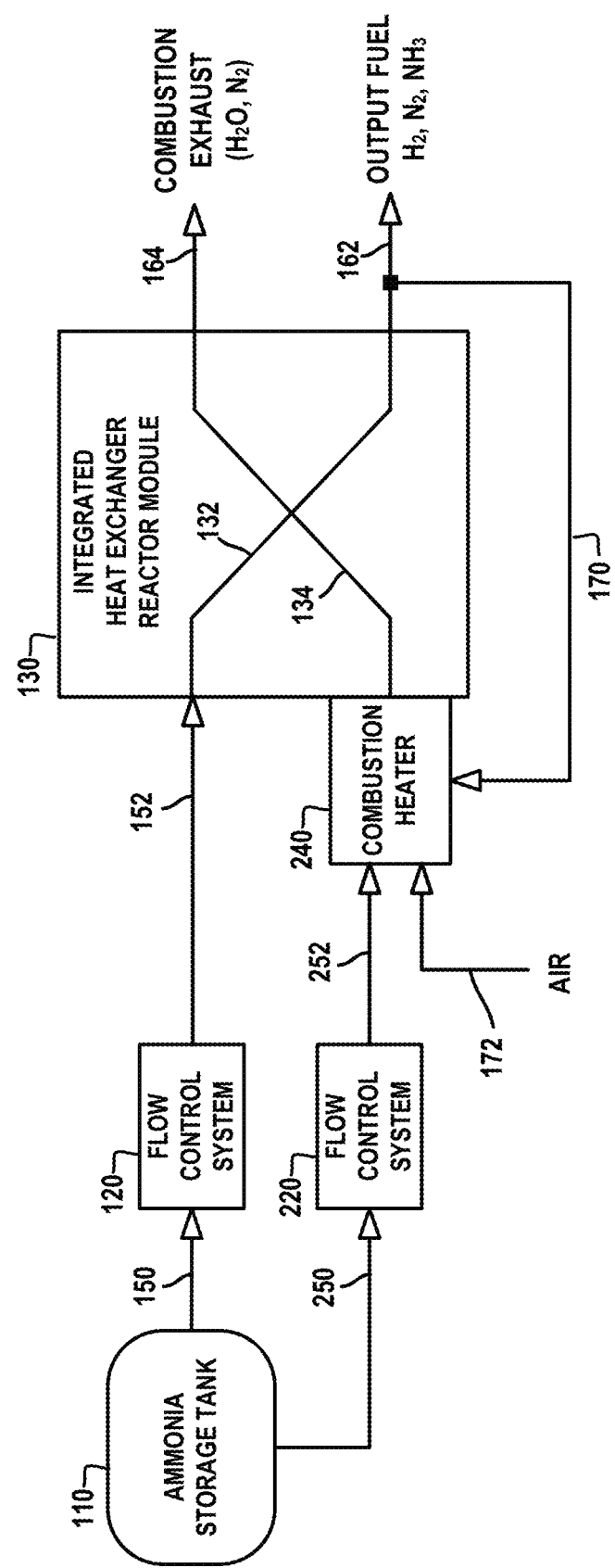
FIG. 2 schematically illustrates a renewable fuel delivery system comprising an integrated heat exchanger reactor module, according to an exemplary embodiment of the disclosure.

FIG. 2 schematically illustrates a renewable fuel delivery system 200 comprising an integrated heat exchanger reactor module, according to another exemplary embodiment of the disclosure. The renewable fuel delivery system 200 of FIG. 2 is similar to the renewable fuel delivery system 100 of FIG. 1, except that the renewable fuel delivery system 200 comprises a second flow control system 220, fuel lines 250 and 252, and a combustion heater 240 which is in fluid communication with the storage tank 110 through the fuel lines 250 and 252, and the second flow control system 220. In particular, FIG. 2 illustrates an exemplary embodiment in which combustion fuel for the combustion heater 240 comprises (i) output fuel drawn from the combustion fuel line 170 which is coupled to the output fuel line 162 and/or (ii) liquid phase or gas phase or liquid-gas two phase ammonia drawn from the storage tank 110 under control of the second flow control system 220. In this regard, the combustion heater 240 comprises a first combustion fuel input port to receive liquid ammonia, and a second combustion fuel input port to receive the output fuel from the integrated heat exchanger reactor module 130, to provide multiple sources of combustion fuel.

In other embodiments, a primary or secondary fuel source for the combustion heater 140 (FIG. 1) or the combustion heater 240 (FIG. 2) may be provided by a separate source. For example, the separate source can be a separate storage tank which stores a combustion fuel (e.g., methane) which is specifically used for operation of the combustion heaters 140 or 240.

Figure 3:
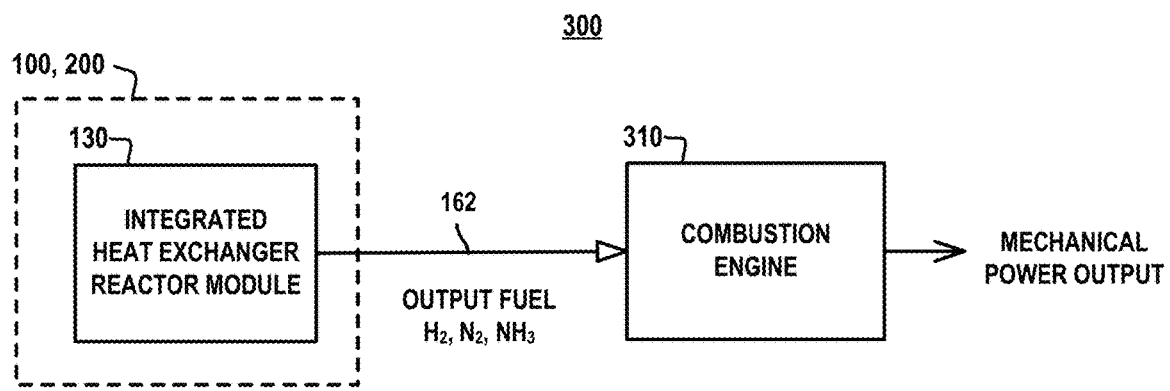
FIG. 3 schematically illustrates a renewable fuel power system for a combustion engine, which is implemented using a renewable fuel delivery system according to an exemplary embodiment of the disclosure.

It is to be appreciated that the exemplary renewable fuel delivery systems 100 and 200 can be utilized to implement a renewable fuel power system for combustion engine vehicles or electric engine vehicles. For example, FIG. 3 schematically illustrates a renewable fuel power system 300 for a combustion engine, which is implemented using a renewable fuel delivery system according to an exemplary embodiment of the disclosure. In particular, the renewable fuel power system 300 comprises a renewable fuel delivery system 100, 200 (which is implemented using the system 100 of FIG. 1, or the system 200 of FIG. 2), and a combustion engine 310. The combustion engine 310 is configured to combust the output fuel provided by the integrated heat exchanger reactor module 130, to thereby produce mechanical power. In some embodiments, the combustion engine 310 comprises a hydrogen internal combustion engine. In some embodiments, the combustion engine 310 comprises an ammonia internal combustion engine. It is to be understood that FIG. 3 schematically illustrates salient components of the fuel delivery system, and that the fuel delivery system would have other components, such as sensors and controllers to monitor and control the fuel generation and delivery of fuel to the combustion engine 310, depending on the type of combustion engine, the type of vehicle in the renewable fuel power system 300 is implemented, etc.

Figure 4:
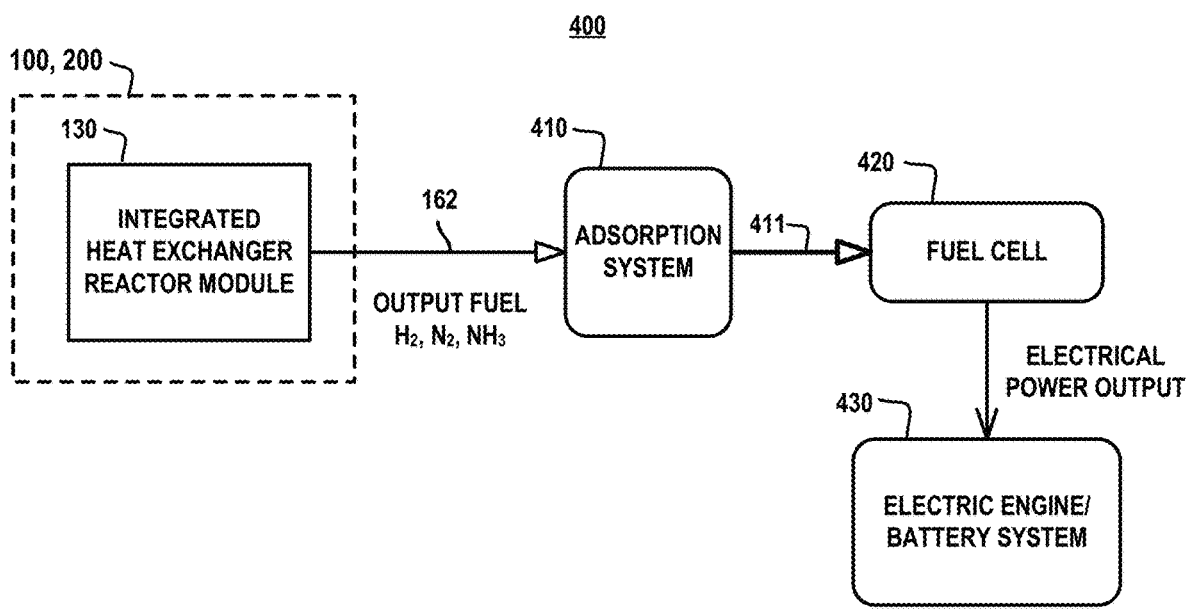
FIG. 4 schematically illustrates a renewable fuel power system for an electric engine, which is implemented using a renewable fuel delivery system according to an exemplary embodiment of the disclosure.

FIG. 4 schematically illustrates a renewable fuel power system 400 for an electric engine, which is implemented using a renewable fuel delivery system according to an exemplary embodiment of the disclosure. In particular, the renewable fuel power system 400 comprises a renewable fuel delivery system 100, 200 (which is implemented using the system 100 of FIG. 1, or the system 200 of FIG. 2), an adsorption system 410, a fuel cell 420, and an electric engine and associated battery system 430. The renewable fuel power system 400 is configured for use with hydrogen fuel cell vehicles in which a hydrogen fuel cell utilizes hydrogen to chemically produce electrical energy to power an electric engine. In this embodiment, the integrated heat exchanger reactor module 130 is configured to deliver hydrogen at a high rate, wherein the fuel output from the integrated heat exchanger reactor module 130 comprises a relatively high concentration of hydrogen with minimal residual ammonia.

The adsorption system 410 is coupled to the output fuel line 162. The adsorption system 410 comprises one or more types of adsorbents which are configured to adsorb residual ammonia and other byproducts of the ammonia reforming process, which may be contained in the fuel that is output from the integrated heat exchanger reactor module 130. In this regard, the adsorption system 410 is configured to refine or purify the hydrogen fuel that is generated by the integrated heat exchanger reactor module 130, before the hydrogen fuel is provided to the fuel cell 420 through a fuel supply line 411. The fuel cell 420 is configured to produce electrical energy using the purified hydrogen fuel that is supplied from the output of the adsorption system 410. In some embodiments, the fuel cell 420 comprises a proton exchange membrane fuel cell (PEMFC) which comprises a proton-exchange membrane that is configured to cause the transformation of chemical energy, which is generated by an electrochemical reaction of the hydrogen fuel and oxygen, into electrical energy that is used to power the electric engine 430 and charge the associated battery. The byproduct of such transformation in the PEMFC is water. In some embodiments, the adsorption system 410 is configured to remove substantially all residual ammonia such that the hydrogen-nitrogen mixture fuel that is supplied to the fuel cell 420 has at least 99.97% purity, with very minimal residual ammonia contamination (e.g., less than 0.1 parts per million). The ammonia can adversely affect the performance of a proton exchange membrane fuel cell, when even a small amount of ammonia is included in the hydrogen supplied to the fuel cell (e.g., ~10 ppm of ammonia over long periods of operation can deteriorate the PEMFC).

In the exemplary embodiments of FIGS. 1, 2, 3, and 4, the integrated heat exchanger reactor module 130 is configured to provide a maximum target hydrogen conversion efficiency from ammonia to hydrogen, depending on the application. For example, in embodiments where the combustion engine 310 is a hydrogen internal combustion engine, the integrated heat exchanger reactor module 130 is configured to deliver hydrogen at a high conversion efficiency, wherein the fuel output from the integrated heat exchanger reactor module 130 comprises a relatively high concentration of hydrogen (e.g., 90% or greater) with minimal residual ammonia contamination. Moreover, for an exemplary embodiment which implements the hydrogen fuel cell 420, the integrated heat exchanger reactor module 130 is configured to deliver hydrogen at a very high conversion efficiency, wherein the fuel output from the integrated heat exchanger reactor module 130 comprises a relatively high concentration of hydrogen (e.g., 99% or greater) with minimal residual ammonia contamination, to thereby reduce the load on the adsorption system 410 to remove the residual ammonia.

On the other hand, in embodiments where the combustion engine 310 is an ammonia internal combustion engine, the integrated heat exchanger reactor module 130 is configured is configured to provide partial ammonia reforming, with a maximum conversion efficiency from $NH_3$ to $H_2$ (e.g., 25%, 50%, etc.). In this instance, the fuel output from the integrated heat exchanger reactor module 130 comprises a mixture of ammonia and hydrogen, wherein the fuel mixture of ammonia and hydrogen advantageously facilitates and enhances combustion of the fuel mixture in the ammonia internal combustion engine. In general, ammonia is known to have relatively slow "burning velocity" and "flame speed" (or "flame velocity"), wherein the "burning velocity" denotes a speed at which a flame front propagates relative to unburned gas, and wherein the "flame speed" is a measured rate of expansion of a flame front in a combustion reaction. The flame speed of a fuel is a property which determines the ability of the fuel to undergo controlled combustion without detonation. In an ammonia combustion engine, the $H_2$—$NH_3$ fuel mixture increases the burning velocity and flame speed of the fuel mixture, and thus increases the combustion rate and efficiency of the ammonia internal combustion engine, as compared to pure $NH_3$ fuel in the ammonia internal combustion engine.

Figure 5A:
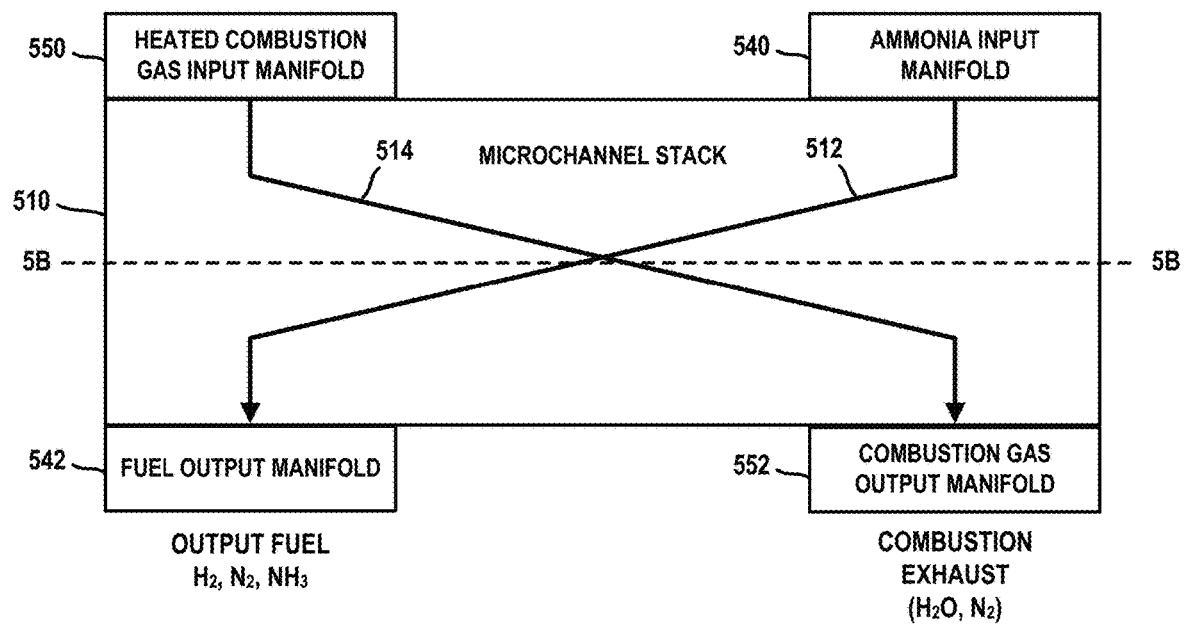
Figure 5B:
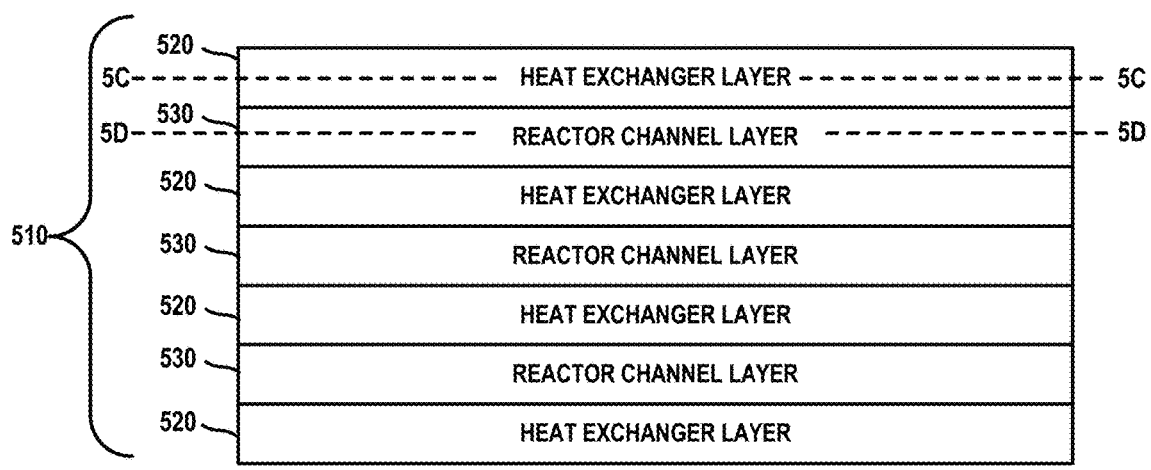
Figure 5C:
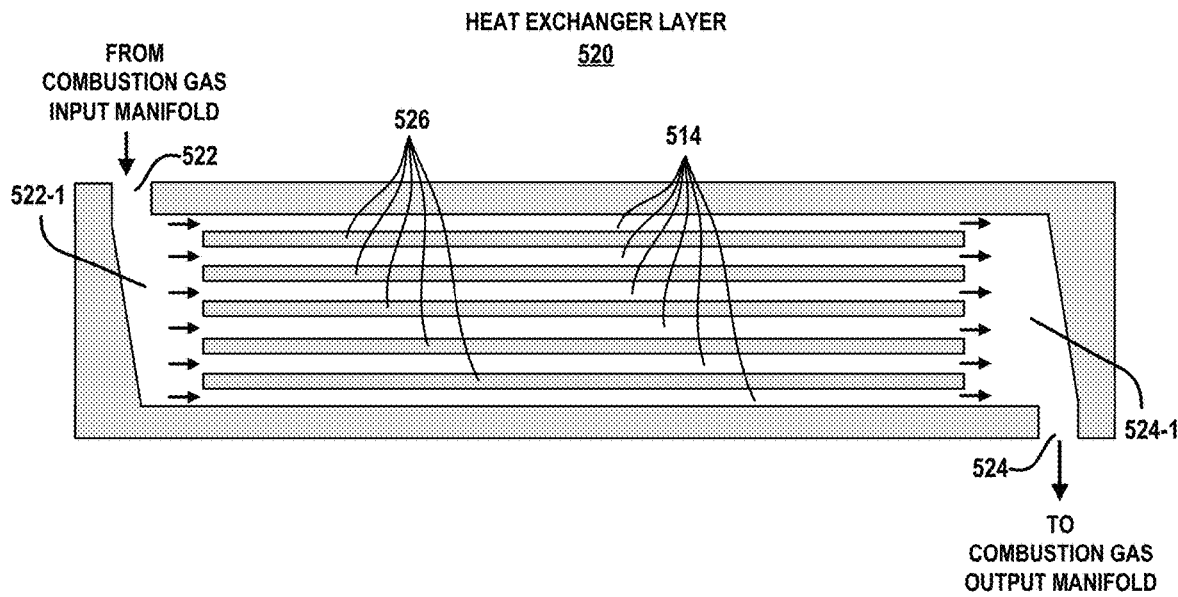
Figure 5D:
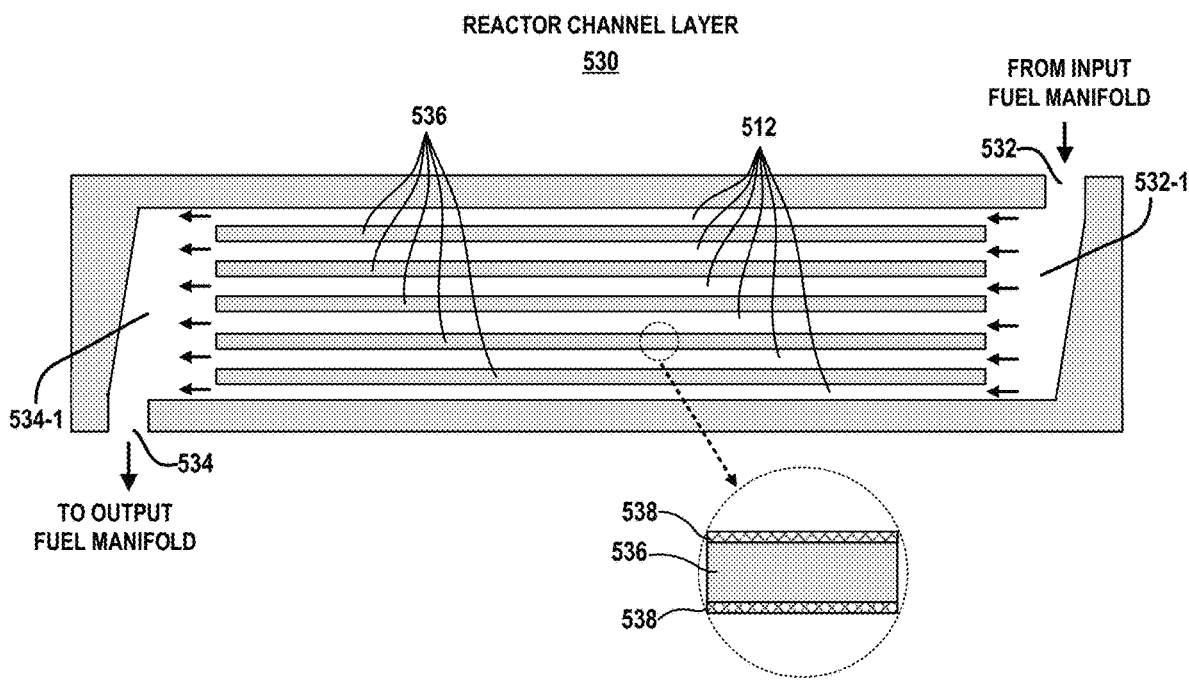

It is to be understood that while the integrated heat exchanger reactor module 130 is generically shown in FIGS. 1, 2, 3, and 4 for ease of illustration and discussion, the integrated heat exchanger reactor module 130 can be implemented using various structural configurations, exemplary embodiments of which will now be discussed in further detail in conjunction with FIGs. FIGS. 5A-5D, 6, and 7. For example, FIGS. 5A, 5B, 5C, and 5D are schematic views of an integrated heat exchanger reactor module 500, according to an exemplary embodiment of the disclosure. More specifically, FIG. 5A is a schematic top view of the integrated heat exchanger reactor module 500, and FIG. 5B is a schematic cross-sectional view of the integrated heat exchanger reactor module 500 along line 5B-5B shown in FIG. 5A. In addition, FIG. 5C is a cross-sectional plan view of a heat exchanger layer 520 taken along line 5C-5C in FIG. 5B, and FIG. 5D is a cross-sectional plan view of a reactor channel layer 530 taken along line 5D-5D in FIG. 5B.

As shown in FIGS. 5A and 5B, the integrated heat exchanger reactor module 500 comprises a stack of layers 510 comprising heat exchanger layers 520 (alternatively, heat generation layers 520), and reactor channel layers 530 (alternatively, reactor layers 530). As schematically illustrated in FIG. 5A, the reactor channel layers 530 collectively provide a plurality of reactor channels 512, and the heat exchanger layers 520 collectively provide a plurality of heat exchanger channels 514. The integrated heat exchanger reactor module 500 comprises an ammonia fuel input manifold 540, a fuel output manifold 542, a heated combustion gas input manifold 550, and a combustion gas output manifold 552.

The ammonia fuel input manifold 540 is configured to receive and distribute ammonia fuel to the inputs of the reactor channels 512 of the reactor channel layers 530. The fuel output manifold 542 is configured to receive output fuel from the reactor channels 512 of the reactor channel layers 530, which is generated as a result of the endothermic catalytic decomposition of the ammonia which flows into and through the reactor channels 512 of the reactor channel layers 530. The combustion gas input manifold 550 is configured to receive and distribute heated combustion gas (generated by a combustion heater) to the inputs of the heat exchanger channels 514 of the heat exchanger layers 520. The combustion gas output manifold 552 is configured to receive combustion gas which is output from the heat exchanger channels 514 of the heat exchanger layers 520.

In some embodiments, as shown in FIG. 5B, the stack of layers 510 comprises multiple reactor channel layers 530, wherein each reactor channel layer 530 is disposed between two heat exchanger layers 520. In this configuration, the heat exchanger layers 520 provide the heat to the reactor channel layers 530 which is needed for the endothermic catalytic decomposition of the ammonia. The stacked configuration with the integrated heat exchanger layers 520 and reactor channel layers 530 provides enhanced heat exchange performance, as well as enhanced conversion efficiency in the endothermic catalytic ammonia decomposition process by the reactor channel layers 530. For example, the direct thermal coupling between the heat exchanger layers 520 and the reactor channel layers 530 enables efficient transfer of thermal energy from the heat exchanger layers 520 to the reactor channel layers 530, with minimal heat loss.

In some embodiments, FIGS. 5C and 5D schematically illustrate structural configurations for the heat exchanger layers 520 and the reactor channel layers 530, respectively, which form the layer stack 510 shown in FIG. 5B. More specifically, as noted above, FIG. 5C is a schematic cross-sectional plan view of a heat exchanger layer 520 taken along line 5C-5C in FIG. 5B, and FIG. 5D is a schematic cross-sectional plan view of a reactor channel layer 530 taken along line 5D-5D in FIG. 5B. Referring to FIG. 5C, the heat exchanger layer 520 comprises an input port 522 and associated input plenum 522-1 (or input manifold 522-1), an output port 524 and associated output plenum 524-1 (or output manifold 524-1), and a plurality inner channel walls 526 which define individual gas flow channels (or heat exchanger channels 514) between the input plenum 522-1 and the output plenum 524-1. The input port 522 of the heat exchanger layer 520 is coupled to the combustion gas input manifold 550, and the output port 524 of the heat exchanger layer 520 is coupled to the combustion gas output manifold 552.

During operation, heated combustion gas flow from the heated combustion gas input manifold through the input port 522 into the input plenum 522-1, and then through the gas channels 514 to the output plenum 524-1, where the combustion gas flows through the output port 524 to the combustion gas output manifold. The input plenum 522-1 and channel walls 526 are configured to evenly distribute the flow of heated combustion gas through the heat exchanger layer 520. For example, in some embodiments, as shown in FIG. 5C, the input plenum 522-1 has an area which decreases in size further away from the input port 522. The decreasing area of the input plenum 522-1 serves to stabilize the pressure across the input to the heat exchange channels 514 to achieve a relatively equal flow of heated combustion gas through the heat exchange channels 514 and, thus, evenly distribute the heated combustion gas flow over the entirety of the heat exchanger layer 520.

Further, as noted above, FIG. 5D is a schematic cross-sectional plan view of a reactor channel layer 530 taken along line 5D-5D in FIG. 5B. Referring to FIG. 5D, the reactor channel layer 530 comprises an input port 532 and associated input plenum 532-1 (or input manifold 532-1), an output port 534 and associated output plenum 534-1 (or output manifold 534-1), and a plurality inner channel walls 536 which define individual reactor channels 512 between the input plenum 532-1 and the output plenum 534-1. The input port 532 of the reactor channel layer 530 is coupled to the input fuel manifold 540, and the output port 534 of the reactor channel layer 530 is coupled to the fuel output manifold 542.

During operation, input fuel (ammonia) flows from the fuel input manifold 540 through the input port 532 into the input plenum 532-1, and then through the reactor channels 512 where the endothermic catalytic ammonia decomposition of ammonia occurs. The resulting fuel that is generated as a result of the reforming process flows into the output plenum 534-1, and then through the output port 534 to the fuel output manifold 542. As further shown in FIG. 5D, the inner surfaces of the reactor channel layer 530, e.g., the sidewall surfaces of the channel walls 536, are coated with a layer of catalyst material 538. The catalyst material 538 is configured to provide a catalytic reaction to cause the decomposition of ammonia into hydrogen, when the catalyst material 538 is heated to a target temperature by thermal energy absorbed by the reactor channel layer 530 from the heat exchanger layers 520 that are in direct thermal contact with the reactor channel layer 530. In some embodiments, the catalyst material 538 is formed on the surfaces of the input plenum 532-1 and the output plenum 534-1 of the reactor channel layer 530.

The input plenum 532-1 and channel walls 536 are configured evenly distribute the flow of fuel through the reactor channel layer 530. For example, in some embodiments, as shown in FIG. 5D, the input plenum 532-1 has an area which decreases in size further away from the input port 532. The decreasing area of the input plenum 532-1 serves to stabilize the pressure of the input fuel across the input of the reactor channels 512 to achieve a relatively equal flow of fuel through the reactor channels 512 and, thus, evenly distribute the input fuel flow over the entirety of the reactor channel layer 530.

As shown in FIGS. 5A, 5C and 5D, the fuel input and output manifolds 540 and 542, and the combustion gas input and output manifolds 550 and 552 are configured to enable opposing flow directions of the combustion gas and fuel in the heat exchanger layer 520 and the reactor channel layer 530. In this configuration, the integrated heat exchanger reactor module 500 implements a counter-flow heat exchanger configuration in which the flow direction of the combustion gas in heat exchanger layers 520 is opposite to the flow direction of the fuel in the reactor channel layers 540. For example, as specifically shown in FIGS. 5A and 5D, the heated combustion gas is shown to flow through the heat exchanger channels 514 from left to right, while the fuel is shown to flow through the reactor channels 512 from right to left.

A counter-flow heat exchanger configuration can be implemented to achieve a more uniform temperature difference between the combustion gas and fuel, which minimizes the thermal stresses throughout the integrated heat exchanger reactor module 500. Moreover, the counter-flow heat exchanger configuration allows the temperature of the output fuel to approach the highest temperature of the input combustion gas. In addition, the counter-flow heat exchanger configuration allows for a more uniform temperature difference, which results in a more uniform rate of heat transfer throughout the integrated heat exchanger reaction module 500. While FIGS. 5A-5D illustrate a counter-flow heat exchanger configuration, it is to be understood that other types of flow configurations, such as cross-flow, can be implemented.

The heat exchanger layer 520 and the reactor channel layer 530 are formed using materials that are suitable for the given application. For example, the heat exchanger layer 520 is formed of a thermally conductive material such as, e.g., aluminum (Al), iron (Fe), stainless steel, copper (Cu), nickel (Ni), magnesium oxide (MgO), aluminum nitride (AlN), hexagonal boron nitride (h-BN), or other types of materials having good thermal conductance properties, which are suitable for the given application. Similarly, the reactor channel layer 530 is formed of a thermally conductive material such as, e.g., Cu, Ni, MgO, AlN, h-BN, or other types of materials having good thermal conductance properties, which are suitable for the given application. In addition, the reactor channel layer 530 is formed of a material which is sufficient to enable the deposition and adhesion of catalyst material on the surfaces of the reactor channel layer 530.

In some embodiments, the stack of heat exchanger and reactor channel layers 520 and 530 (FIG. 5B) are connected together using thin gaskets or seals (e.g., graphite gaskets) and a compression connection mechanism which is configured to compress the heat exchanger layers 520 and the reactor channel layers 530 together with sufficient force to form tight seals via the gaskets to prevent leakage of fuel and combustion gas from layer stack 510. Similarly, the fuel and combustion gas input and output manifolds (e.g., 540, 542, 550, and 552, FIG. 5A) can be connected to the stack structure 510 using gaskets and compression connections. The use of gaskets and compression connection mechanisms allows for a modular design in which heat exchanger layers 520 and the reactor channel layers 530 can be added or removed from the stack 510, or otherwise replaced. In other embodiments, the stack of heat exchanger and reactor channel layers 520 and 530 (FIG. 5B) are connected together by welding or brazing the heat exchanger and reactor channel layers 520 and 530 together. In this instance, the fuel and combustion gas input and output manifolds (e.g., 540, 542, 550, and 552, FIG. 5A) can be connected to the stack structure 510 using gaskets and compression connections, or by welding or brazing.

Figure 6A:
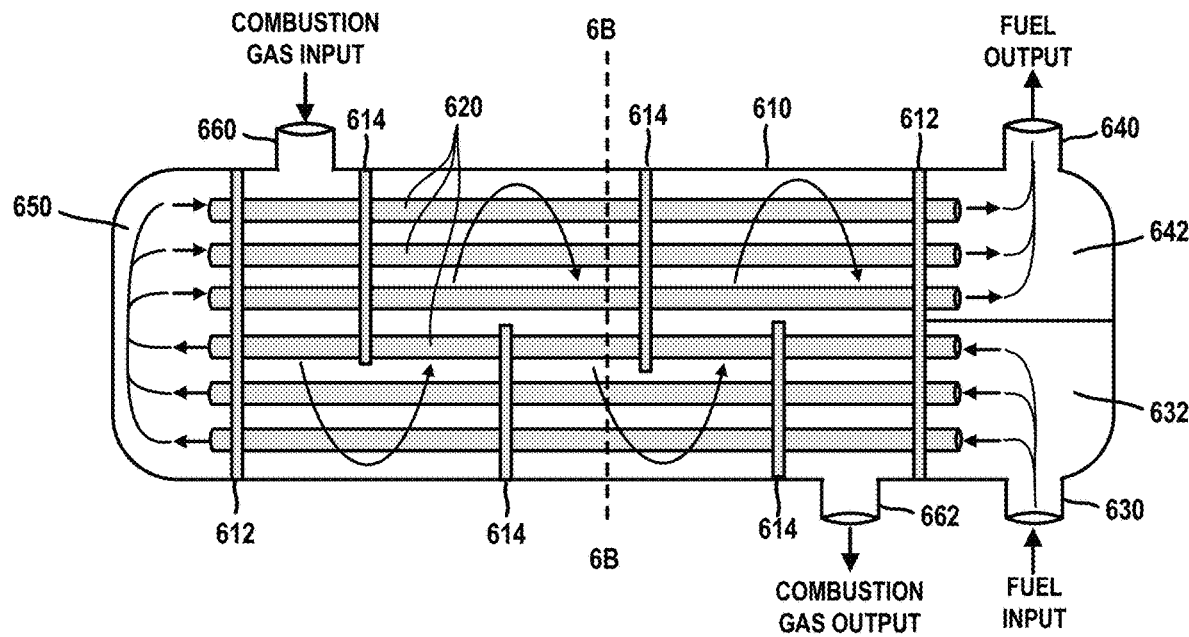
FIGS. 6A and 6B schematically illustrate an integrated heat exchanger reactor module, according to another exemplary embodiment of the disclosure.
Figure 6B:
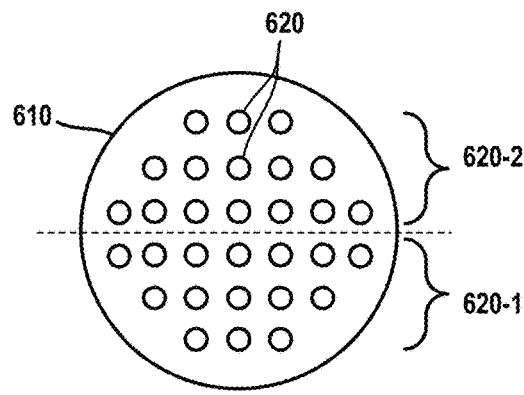

FIGS. 6A and 6B schematically illustrate an integrated heat exchanger reactor module, according to another exemplary embodiment of the disclosure. In particular, FIG. 6A is a schematic cross-sectional view of an integrated heat exchanger reactor module 600 having a "shell-and-tube" structural configuration, and FIG. 6B is a schematic cross-sectional view of the integrated heat exchanger reactor module 600 taken along line 6B-6B in FIG. 6A. The integrated heat exchanger reactor module 600 comprises a shell 610, tubeplates 612, baffles 614, a set of tubes 620 (alternatively, tube bundle 620) disposed within the shell 610, a fuel input port 630 and associated input plenum 632, a fuel output port 640 and associated output plenum 642, a transfer manifold 650, a combustion gas input port 660, and a combustion gas output port 662. In the exemplary embodiment of FIGS. 6A and 6B, the tubes 620 comprise a layer of catalyst material formed on the inner surfaces of the tubes 620, wherein the tubes 620 serve as reactor channels of the integrated heat exchanger reactor module 600. The tubeplates 612 are configured to secure the tubes 620 in place, and to seal the manifold regions 632, 642, and 650 from the inner region of the shell 610 in which combustion gas flows.

As shown in FIG. 6A, heated combustion gas flows into the shell 610 through the combustion gas input port 660, and flows out of the shell 610 through the combustion gas output port 662. The baffles 614 serve as barriers which are configured to generate turbulence and direct the flow of combustion gas through the shell 610 around the baffles 614 in a way (e.g., cross-flow configuration) which causes the flow of heated combustion gas to repeatedly pass over the tube bundle 620 (as schematically illustrated by the curved arrows in FIG. 6A), thus maximizing the transfer of thermal energy to the tubes 620. While the baffles 614 are generically depicted in FIG. 6A, it is to be understood that the size, shape, and/or orientation of the baffles 614 can be configured to maximize heat transfer to the tube bundle 620.

As further shown in FIGS. 6A and 6B, of first portion 620-1 of the tube bundle 620 is in fluid communication with the input plenum 632 and the transfer manifold 650, while a second portion 620-2 of the tube bundle 620 is in fluid communication with the output plenum 642 and the transfer manifold 650. During operation, ammonia fuel flows into the input plenum 632 through the fuel input port 630. The input fuel flows through the first portion 620-1 of the tube bundle 620 from the input plenum 632 to the transfer manifold 650. The fuel flow transfer manifold 650 is transferred into the second portion 620-2 of the tube bundle 620, wherein the fuel then flows from the transfer manifold 650 to the output plenum 642. The resulting fuel stream is then output from the fuel output port 640. As shown in FIG. 6A, the transfer manifold 650 provides a reservoir that enables the fuel output from the first portion 620-1 of the tube bundle 620 to be transferred to the input of the second portion 620-2 of the tube bundle.

The exemplary "shell-and-tube" integrated heat exchanger reactor module 600 shown in FIGS. 6A and 6B provides an exemplary embodiment of a straight-tube heat exchanger configuration in which the ammonia fuel passes through the shell 610 in two passes—once through the first portion 620-1 of the tube bundle 620, and then a second time through the second portion 620-2 of the tube bundle 620. It is to be understood that the exemplary embodiment shown in FIGS. 6A and 6B is a generic illustration to explain the use of "shell-and-tube" configuration to implement an integrated heat exchanger reactor module, and that other "shell-and-tube" configurations can be used to implement integrated heat exchanger reactor modules, according to other embodiments of the disclosure.

For example, in the exemplary embodiment of FIGS. 6A and 6B, the number of tubes 620 and/or the length of the tubes 620 can vary, depending on the application. Moreover, the straight-tube heat exchanger configuration can be implemented where the ammonia fuel passes through the shell 610 in only one pass, wherein all tubes of the tube bundle extend through the inner chamber of the shell 610 between an input manifold and an output manifold. In other embodiments, a "U-tube" heat exchanger configuration can be implemented in which the tubes of the tube bundle are U-shaped to thereby allow the tubes to pass through the inner chamber of the shell 610 two times, while eliminating the need for the transfer manifold 650. In this instance, the U bends of the tubes would be disposed in the inner chamber of the shell 610 and heated by the combustion gas.

Figure 7:
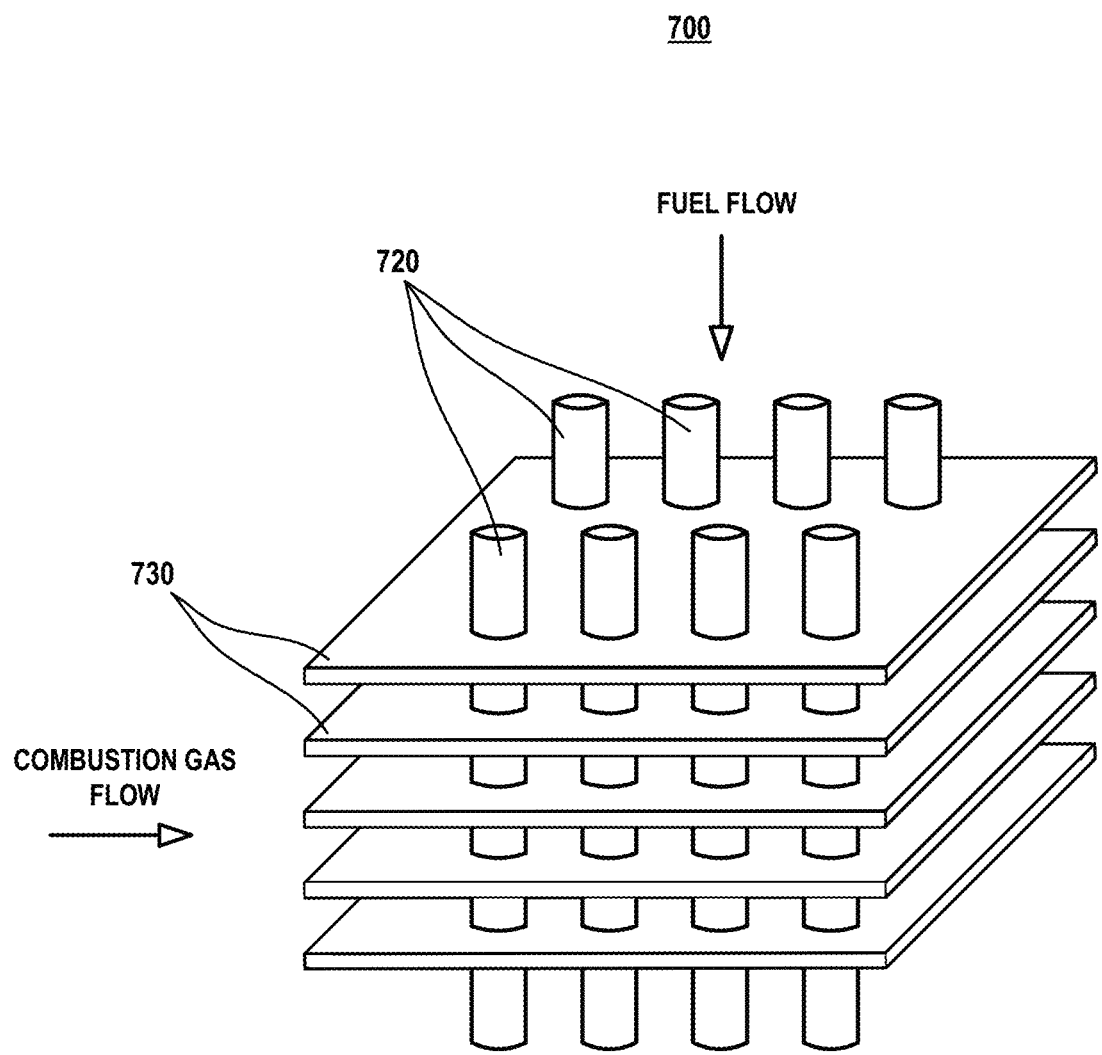
FIG. 7 schematically illustrates an integrated heat exchanger reactor module, according to another exemplary embodiment of the disclosure.

It is to be appreciated that an integrated heat exchanger reactor module can be implement using other types of heat exchanger configurations. For example, FIG. 7 schematically illustrates an integrated heat exchanger reactor module, according to another exemplary embodiment of the disclosure, which is implemented using a "plate-and-tube" heat exchanger configuration. In particular, FIG. 7 is a high-level schematic illustration of an integrated heat exchanger reactor module 700 which comprises a plurality of tubes 720 and a plurality of plates 730 (e.g., thin fins) thermally coupled to the outer surfaces of the tubes 720. In the exemplary embodiment of FIG. 7, the tubes 720 are formed of a thermally conductive material (e.g., copper, aluminum, iron, nickel, stainless steel, etc., wherein a layer of catalyst material is disposed on the inner surfaces of the tubes 720. Similarly, the plates 730 are formed of a thermally conductive material such as copper, aluminum, etc.

In the exemplary embodiment of FIG. 7, fuel flows in the tubes 720 in a first direction, while heated combustion gas flows though spaces between the plates 730 in a second direction which is essentially perpendicular to the flow of fuel, thereby providing a "cross-flow" configuration. In some embodiments, the plates 730 are spaced at a given inter-plate spacing which is configured to force flow of combustion gas in the direction perpendicular to the fuel flow, and thereby evenly distribute the flow of heated combustion gas along the length of the tubes 720. In this regard, the plates 730 are configured to perform several functions including (i) directing the even flow of the combustion gas perpendicular to the tubes 720, and (ii) absorbing heat (via convection heating) from the heated combustion gas, and transferring the absorbed heat to the tubes 720 (via thermal conduction) to enhance the heating of the tubes 720. The heating of the tubes 720 via the heat combustion gas and heat transfer from the plates 730 causes the heating of the catalyst material coated on the inner walls of the tubes 720 to achieve the endothermic catalytic decomposition of the ammonia which flows through the tubes 720.

It is to be appreciated the exemplary integrated heat exchanger and rector modules as discussed herein provide compact integrated designs which are configured to maximize heat transfer from heat exchanger channels to reactor channels achieve the endothermic catalytic decomposition of the ammonia which flows through the reactor channels, while minimizing heat loss of the combustion gas through absorption of heat by elements other than the reactor channels. It is to be understood that the integrated heat exchanger and reactor modules shown in FIGS. 5A-5D, 6A, 6B, and 7 are illustrative embodiments, and that other structural configurations of integrated heat exchanger reactor modules can be readily envisioned by one of ordinary skill in the art, which are based on the concepts and principles as discussed herein to produce hydrogen by endothermic catalytic decomposition of ammonia. For example, in some embodiments, an integrated heat exchanger reactor module can be implemented using a "plate-and-frame" type heat exchanger configuration, which comprises a plurality of parallel plates that are stacked together. With such configuration, the parallel plates include alternating heat exchanger and reactor plates, wherein heated combustion flows through the heat exchanger plates, and fuel flows through the reactor plates in, e.g., a counter flow direction. The parallel plates are thermally coupled to each other using suitable techniques to achieve heat transfer from the heat exchanger plates to the reactor plates.

Moreover, it is to be understood that FIGS. 5A-5D, 6A, 6B, and 7 are high-level schematic illustrations that are meant to generically illustrate fundamental structural configurations and operating modes of the integrated heat exchanger reactor modules according to exemplary embodiment of the disclosure, and that the actual configuration of an integrated heat exchanger reactor for reforming ammonia (to produce hydrogen) will vary with regard to, e.g., the physical size and layout of the reactor, the types of catalysts used, the operating temperatures, and pressures, etc., depending on the amount of power needed to operate a given type of vehicle, and the type of engine (combustion or electric) of the vehicle, etc. Indeed, depending on the given application, an integrated heat exchanger reactor module would be configured to operate over a wide dynamic range and with a very fast response time to supply a fuel cell or internal combustion engine under all drive conditions for the given vehicle. The integrated heat exchanger reactor module would have to be properly sized to supply hydrogen fuel (in terms of gallons/second or liters/minute) for full power operation of a given fuel cell or combustion engine, which would depend on the overall conversion efficiency of the integrated heat exchanger reactor module for a given input flow rate of ammonia, which in turn is based on, e.g., the type of catalyst used, the temperature needed for the reforming process, etc.

As noted above, the exemplary integrated heat exchanger reactor modules as discussed herein each comprise reactor channels that are fabricated by, e.g., forming a layer of catalyst material on a surface of reactor element. For example, in the exemplary embodiment of FIGS. 5A-5D, the reactor channel layers 530 which form the reactor components of the integrated heat exchanger reactor module 500 are formed by depositing a layer of catalyst material 538 on the inner surfaces of the reactor channel layer 530, e.g., the sidewall surfaces of the channel walls 536. Moreover, in the exemplary embodiments of FIGS. 6A and 6B, and FIG. 7, the rector elements are formed by depositing a layer of catalyst material on the inner surfaces of the tubes through which fuel flows. Various techniques for depositing catalyst material on reactor surfaces to form reactor channels will now be discussed in further detail in conjunction with FIG. 8.

Figure 8:
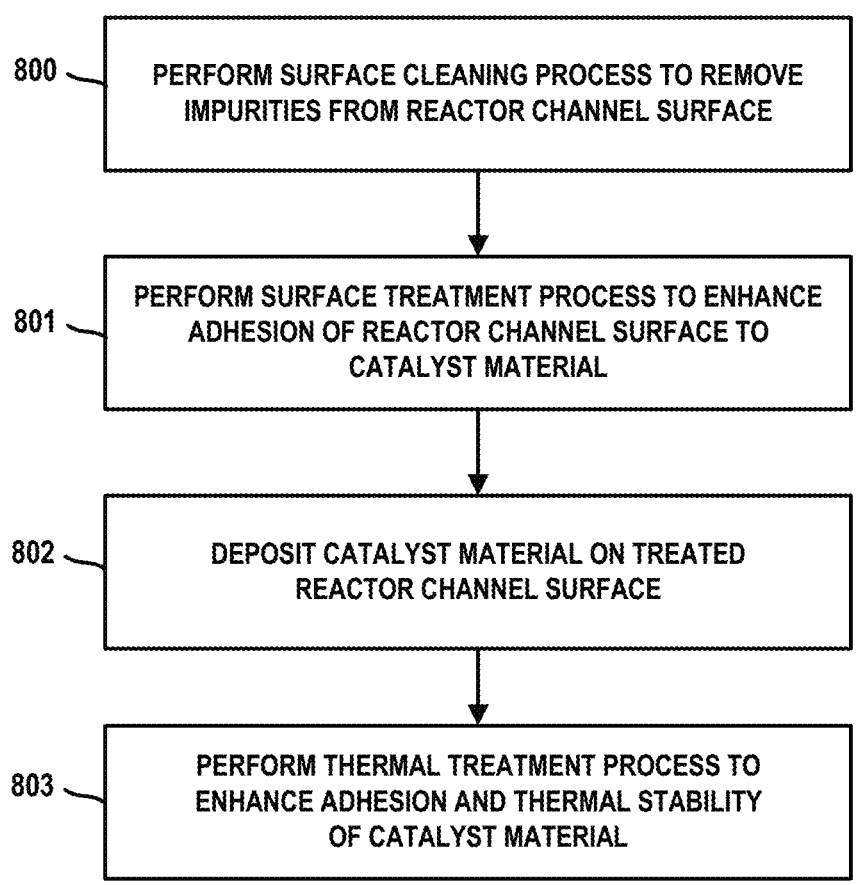
FIG. 8 is a flow diagram of a process to form a layer of catalyst material on a surface of a reactor channel element, according to an exemplary embodiment of the disclosure.

FIG. 8 is a flow diagram of a process to form a layer of catalyst material on a surface of a reactor channel element, according to an exemplary embodiment of the disclosure. An initial step comprises performing a surface cleaning process to remove impurities from a reactor channel surface (block 800). In some embodiments, the cleaning process is performed using a chemical cleaning process or a physical cleaning process to remove impurities from the reactor channel surface. For example, a chemical cleaning process comprises etching or electropolishing reactor the channel surface using an acidic solvent or a basic solvent. A physical cleaning process comprises, e.g., sand blasting, sanding, or polishing the reactor channel surface. The cleaning process will depend on the type of material that forms the rector channel element (e.g., the reactor channel layer 530, FIG. 5D, the tubes 620, FIG. 6A, tubes 720, FIG. 7). As noted above, the reactor channel element can be formed of copper, aluminum, iron, stainless steel, nickel, aluminum nitride, hexagonal boron nitride, or combination thereof.

Next, a surface treatment process is performed to enhance the adhesion of the reactor channel surface to a catalyst material to be deposited (block 801). In particular, in some embodiments, the surface treatment process is performed using a chemical surface treatment process which is configured to effectively increase the surface area of the reactor channel surface. In some embodiments, the chemical surface treatment process comprises etching the surface of the reactor channel element using an etching solution comprising at least one of hydrochloric acid, nitric acid, and sulfuric acid. In some embodiments, the chemical surface treatment comprises performing an alloying and leaching process, wherein the alloying and leaching process comprises aluminum anodizing the surface of the reactor channel element and selectively leaching out the surface using a basic solution to thereby make a porous surface layer.

Next, a layer of catalyst material is deposited on the treated reactor channel surface (block 802). In some embodiments, the layer of catalyst material is deposited using a wet deposition process wherein the reactor channel surface is dipped into a solution which contains the desired catalyst material and a suitable binder material. In other embodiments, the layer of catalyst material is deposited using a dry deposition process such as physical vapor deposition (PVD), chemical vapor deposition (CVD), or atomic layer deposition (ALD). In some embodiments, the layer of catalyst material comprises a single layer or multilayer coating, which is configured to enable high-efficiency endothermic catalytic decomposition of ammonia at lower reaction temperatures, and which can generate a relatively large amount of hydrogen per unit weight or volume of ammonia. The layer of catalyst material is designed to maintain favorable physical and chemical properties under harsh reaction conditions, and to exhibit high thermal stability and optimal heat transfer rates to enable efficient endothermic ammonia decomposition reactions.

In some embodiments, the layer of catalyst material comprises ruthenium which is formed using one or more ruthenium-based precursors such as $RuCl_3$ or $Ru_3(CO)_{12}$. In some embodiments, a layer of support material is deposited on the treated reactor channel surface prior to depositing the catalyst material. For example, in some embodiments, the support material comprises a thin layer of carbon (C), aluminum oxide (e.g., $Al_2O_3$), hexagonal boron nitride, or suitable types of 2D materials such as graphene, graphene oxide, or graphite materials. In some embodiments, the layer of catalyst material has a thickness in range from about 1 nanometer to about 20 nanometers.

Next, a thermal treatment process is performed to enhance the adhesion of the layer of catalyst material to the treated reactor channel surface, and to enhance a thermal stability of the layer of catalyst material (block 803). The thermal treatment process is configured to enhance the longevity and reliability of the layer of catalyst material under high operating temperatures (>500° C.), and in the presence of impurities. The layer of catalyst material can be doped, in addition to thermally treated, in manner which is suitable to optimize the performance of the catalyst with regard to longevity, and hydrogen conversion efficiency.

In some embodiments, the layer of catalyst material can be thermally treated by a process which comprises performing a thermal treatment process in an environment of, e.g., ammonia or hydrogen, etc., at a target temperature in a range of about 400° C. to about 600° C., and for a period of time from about 2 hours to about 10 hours. The thermal treatment of the catalyst material serves to enhance the performance of the catalyst material with respect to, e.g., a rate of hydrogen production (in units of millimoles of hydrogen produced per minute per gram of catalyst loaded (mmol/min/g)), a conversion efficiency of ammonia (e.g., percentage or fraction of ammonia that is converted to hydrogen), and lower activation energy (e.g., lower temperature needed for the endothermic catalytic decomposition of ammonia).

Figure 9:
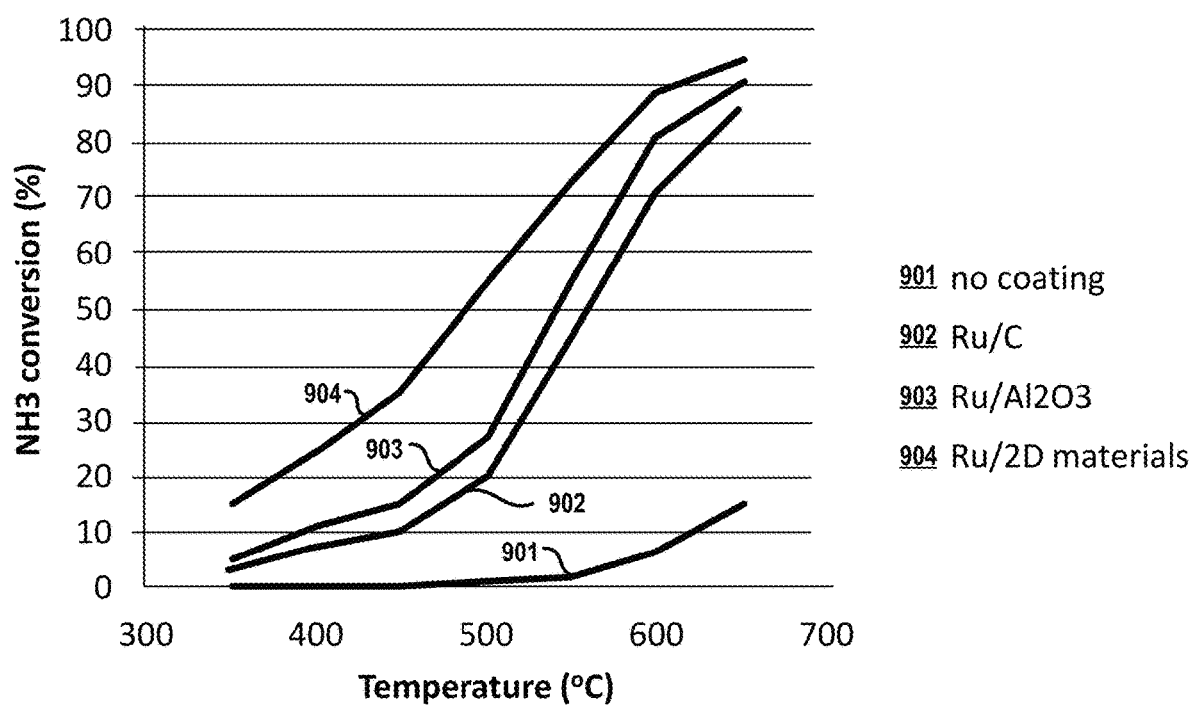
FIG. 9 graphically illustrates a conversion efficiency of ammonia to hydrogen and nitrogen as a function of temperature for different layers of catalyst material coated on a surface of a reactor channel element, according to an exemplary embodiment of the disclosure.

FIG. 9 graphically illustrates a conversion efficiency of ammonia to hydrogen and nitrogen as a function of temperature for different layers of catalyst material coated on a surface of a reactor channel element, according to an exemplary embodiment of the disclosure. More specifically, FIG. 9 is a graph 900 with four curves 901, 902, 902, and 904, which depicts a percentage of ammonia that is converted to hydrogen as a function of temperature. The curve 901 represents a conversion efficiency of ammonia to hydrogen as a function of temperature with no catalytic layer coated on a metallic surface of a reactor channel element (e.g., stainless steel). The curve 902 represents a conversion efficiency of ammonia to hydrogen as a function of temperature with a catalytic layer of Ru/C coated on the metallic surface of the reactor channel element. The curve 903 represents a conversion efficiency of ammonia to hydrogen as a function of temperature with a catalytic layer of $Ru/Al_2O_3$ coated on the metallic surface of the reactor channel element. The curve 904 represents a conversion efficiency of ammonia to hydrogen as a function of temperature with a catalytic layer of Ru/2D material coated on the metallic surface of the reactor channel element. The 2D material comprises, e.g., boron nitride, graphene, graphene oxide, graphite, and other suitable 2D materials.

Figure 10:
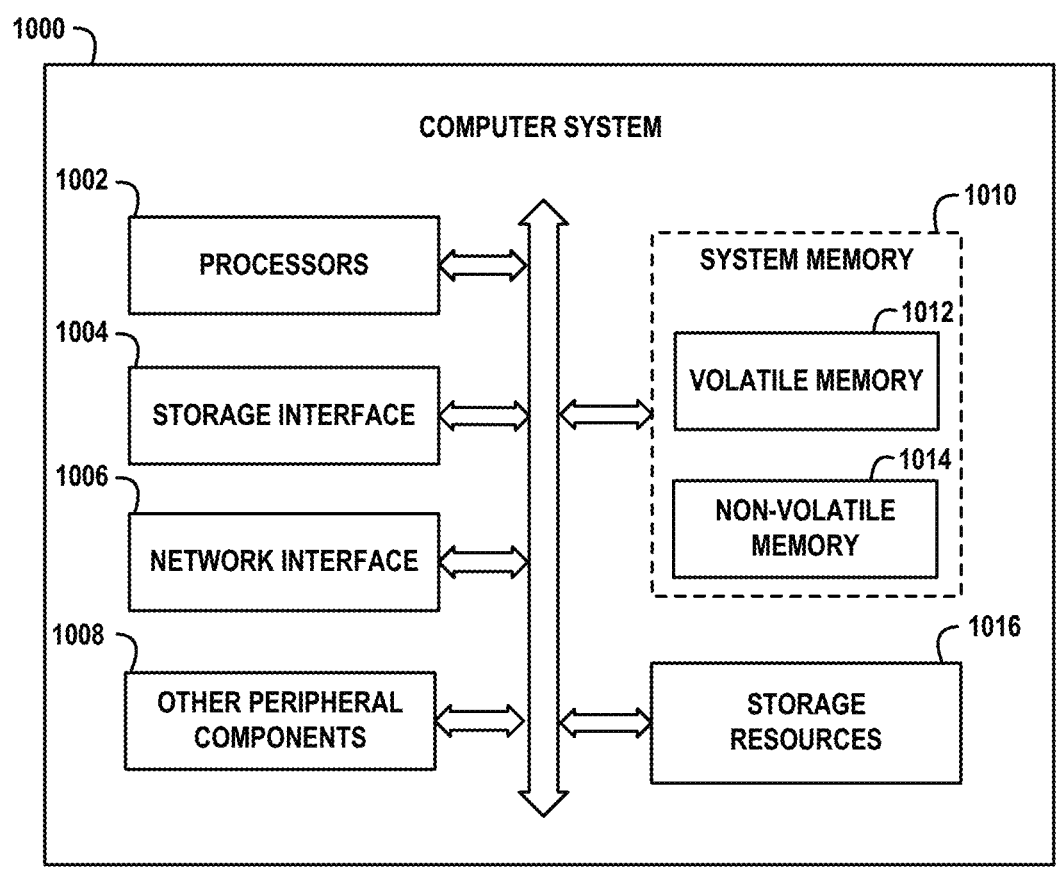
FIG. 10 schematically illustrates an exemplary architecture of a computer system which is configured to monitor and control a renewable fuel delivery system, according to an exemplary embodiment of the disclosure.

FIG. 10 schematically illustrates an exemplary architecture of a computer system 1000 which is configured to monitor and control a renewable fuel delivery system, according to an exemplary embodiment of the disclosure. The computer system 1000 comprises processors 1002, storage interface circuitry 1004, network interface circuitry 1006, peripheral components 1008, system memory 1010, and storage resources 1016. The system memory 1010 comprises volatile memory 1012 and non-volatile memory 1014. The processors 1002 comprise one or more types of hardware processors that are configured to process program instructions and data to execute a native operating system (OS) and applications that run on the computer system 1000.

For example, the processors 1002 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors (e.g., multi-core processors), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), artificial intelligence (AI) accelerators, and other types of specialized processors or coprocessors that are configured to execute one or more fixed functions.

The storage interface circuitry 1004 enables the processors 1002 to interface and communicate with the system memory 1010, the storage resources 1016, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 1006 enables the computer system 1000 to interface and communicate with a network and other system components. The network interface circuitry 1006 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc. The computer system 1000 can be operatively coupled to a communications network such as the Internet, an internet and/or extranet, or an intranet and/or extranet that is in communication with the Internet. The network in some cases is a telecommunication and/or data network. The network can include one or more computer servers, which can enable distributed computing, such as cloud computing.

The system memory 1010 comprises various types of memory such as volatile random-access memory (RAM), non-volatile RAM (NVRAM), or other types of memory, in any combination. The volatile memory 1012 may be a dynamic random-access memory (DRAM) (e.g., DRAM DIMM (Dual In-line Memory Module), or other forms of volatile RAM. The non-volatile memory 1014 may comprise one or more of NAND Flash storage devices, solid-state drive (SSD) devices, or other types of next generation non-volatile memory (NGNVM) devices. The term "memory" or "system memory" as used herein refers to volatile and/or non-volatile memory which is utilized to store application program instructions that are read and processed by the processors 1002 to execute a native OS and one or more applications or processes hosted by the computer system 1000, and to temporarily store data that is utilized and/or generated by the native OS and application programs and processes running on the computer system 1000. The storage resources 1016 can include one or more hard disk drives (HDDs), SSD devices, etc.

The computer system 1000 is programmed or otherwise configured to monitor and control various functions and operations of the exemplary renewable fuel delivery systems as described herein. For example, the computer system 1000 may be configured to (i) control a flow of a source material (e.g., ammonia) from a storage tank to an integrated heat exchanger reactor module, (ii) control an operation of a combustion heater of the integrated heat exchanger reactor module (iii) control a flow of fuel (e.g., hydrogen fuel, hydrogen-ammonia fuel mixture, etc.) which is output from the integrated heat exchanger reactor module and supplied to, e.g., a hydrogen fuel cell, or a combustion engine), (iv) control a reforming process (e.g., endothermic catalytic decomposition of ammonia) performed by the integrated heat exchanger reactor module to, e.g., adjust a rate and/or efficiency of converting ammonia to hydrogen, etc. The computer system 1000 may control a flow of the ammonia material to the integrated heat exchanger reactor module and/or a flow of the fuel output from the integrated heat exchanger reactor module to the one or more fuel cells by modulating one or more flow control mechanisms (e.g., one or more valves). The computer system 1000 may control an operation of a combustion heater unit by controlling a flow of combustion fuel that is applied to the combustion heater unit, or otherwise activating/deactivating the operation of the combustion heater unit.

In some embodiments, the monitoring and control processes are implemented by the computer system 1000 executing software, wherein program code is loaded into the system memory 1010 (e.g., volatile memory 1012), and executed by the processors 1002 to perform the control functions as described herein. In this regard, the system memory 1010, the storage resources 1016, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

In some embodiments, the peripheral components 1008 include hardware interfaces (and drivers) for communicating with various sensors devices that are disposed in various modules and components of a renewable fuel power system. The computer system 1000 can control the operation of various modules and components of the renewable fuel power system by receiving and processing sensors readings (e.g., temperature measurements, flow rates, etc.) from various sensor devices of the modules/components of the renewable fuel power system, and generating control signals that are sent to the modules/components of the renewable fuel power system to control the operation of the renewable fuel power system.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An integrated heat exchanger and reactor apparatus comprising:
   a stack of layers comprising a plurality of reactor channel layers and a plurality of heat exchanger channel layers, wherein the plurality of reactor channel layers and the plurality of heat exchanger channel layers are in thermal contact with each other;
   wherein each of the plurality of heat exchanger channel layers comprises a plurality of heat exchanger channels fluidically coupled to a heated gas input plenum and a heated gas output plenum;
   wherein the heated gas input plenum is fluidically coupled to a heated gas input port, and wherein the heated gas output plenum is fluidically coupled to a heated gas output port;
   wherein each of the plurality of reactor channel layers comprises a plurality of reactor channels fluidically coupled to a fuel input plenum and a fuel output plenum;
   wherein the fuel input plenum is fluidically coupled to a fuel input port, and wherein the fuel output plenum is fluidically coupled to a fuel output port;
   wherein each of the reactor channels comprises a layer of catalyst material configured to decompose ammonia to generate a fuel stream comprising hydrogen using thermal energy that is absorbed by the reactor channels from the plurality of heat exchanger channel layers;
   wherein a cross section of the heated gas input plenum decreases along a direction of flow leading away from the heated gas input port; and
   wherein a cross section of the fuel input plenum decreases along a direction of flow leading away from the fuel input port.

2. The apparatus of claim 1, wherein the heat exchanger channels are configured to pass heated gas through the heat exchanger channels to provide the thermal energy.

3. The apparatus of claim 2, further comprising a combustion heater configured to generate the heated gas.

4. The apparatus of claim 3, wherein the combustion heater is configured to generate the heated combustion gas by combusting a portion of the fuel stream that is output from the plurality of reactor channels.

5. The apparatus of claim 3, wherein the combustion heater is configured to generate the heated combustion gas by combusting the ammonia that is output from a storage tank.

6. The apparatus of claim 1, wherein:
   the integrated heat exchanger and reactor module comprises:
   a heated gas input manifold;
   a heated gas output manifold;
   a fuel input manifold; and
   a fuel output manifold;
   wherein the fuel input port is fluidically coupled to the fuel input manifold, and the fuel output port is fluidically coupled to the fuel output manifold; and
   wherein the heated gas input port is fluidically coupled to the heated gas input manifold, and the heated gas output port is fluidically coupled to the heated gas output manifold.

7. The apparatus of claim 1, further comprising a storage tank configured to store the ammonia in liquid form.

8. The apparatus of claim 1, further comprising a combustion engine fluidically coupled to the fuel output port, wherein the combustion engine is configured to combust the generated fuel stream.

9. The apparatus of claim 1, wherein the layer of catalyst material comprises ruthenium.

10. The apparatus of claim 1, wherein at least one of (1) the plurality of heat exchanger channel layers or (2) the plurality of reactor channel layers comprise aluminum nitride (AlN).

11. The apparatus of claim 1, further comprising:
one or more adsorbents configured to adsorb residual ammonia in the fuel stream;
a fuel cell configured to react the hydrogen in the fuel stream to generate electrical power;
an electric engine for a vehicle configured to be powered by the generated electrical power; and
a battery configured to be charged by the generated electrical power.

12. The apparatus of claim 1, comprising a plurality of graphite gaskets configured to seal the stack of layers to prevent leakage of the combustion gas, the ammonia, and the fuel stream.

13. The apparatus of claim 1, wherein at least one of (1) the plurality of heat exchanger channels or (2) the plurality of reactor channel layers comprise a thermally conductive material and are further configured to absorb thermal energy from the heated gas; wherein the thermally conductive material comprises hexagonal boron nitride (h-BN).

14. An integrated heat exchanger and reactor apparatus comprising:
a heat exchanger channel; and
a reactor channel which is thermally coupled to the heat exchanger channel;
wherein the reactor channel comprises a layer of catalyst material configured to decompose ammonia to generate a fuel stream comprising hydrogen using thermal energy that is absorbed by the reactor channel from the heat exchanger channel;
wherein the reactor channel comprises a tube having an inner surface, wherein the layer of catalyst material is disposed on the inner surface of the tube;
wherein the heat exchanger channel is defined by a plurality of plates that are coupled to the tube;
wherein the plates are configured to direct the flow of heated gas in a direction that is perpendicular to a direction of a flow of fuel through the tube;
wherein the heat exchanger channel is fluidically coupled to a heated gas input port and a heated gas output port;
wherein the reactor channel is fluidically coupled to a fuel input plenum and a fuel output plenum;
wherein the fuel input plenum is fluidically coupled to a fuel input port, and wherein the fuel output plenum is fluidically coupled to a fuel output port; and
wherein a cross section of the fuel input plenum decreases along a direction of flow leading away from the fuel input port.

15. The apparatus of claim 14, wherein the layer of catalyst material comprises ruthenium.

16. The apparatus of claim 14, wherein at least one of (1) the plates or (2) the tube further comprise aluminum nitride (AlN).

17. The apparatus of claim 14, further comprising:
one or more adsorbents configured to adsorb residual ammonia in the fuel stream;
a fuel cell configured to react the hydrogen in the fuel stream to generate electrical power;
an electric engine for a vehicle configured to be powered by the generated electrical power; and
a battery configured to be charged by the generated electrical power.

18. The apparatus of claim 14, wherein at least one of (1) the plates or (2) the tube comprise a thermally conductive material and are further configured to absorb thermal energy from the heated gas; wherein the thermally conductive material comprises hexagonal boron nitride (h-BN).

* * * * *